United States Patent
Fukushima et al.

(10) Patent No.: US 10,287,711 B2
(45) Date of Patent: May 14, 2019

(54) MULTIFILAMENT AND BRAID

(71) Applicant: TOYOBO CO., LTD., Osaka-shi, Osaka (JP)

(72) Inventors: Yasunori Fukushima, Otsu (JP); Masayuki Shirako, Otsu (JP); Hirokazu Nishimura, Otsu (JP)

(73) Assignee: TOYOBO CO., LTD., Osaka-shi (JP)

( * ) Notice: Subject to any disclaimer, the term of this patent is extended or adjusted under 35 U.S.C. 154(b) by 346 days.

(21) Appl. No.: 15/128,860

(22) PCT Filed: Mar. 13, 2015

(86) PCT No.: PCT/JP2015/057442
§ 371 (c)(1),
(2) Date: Sep. 23, 2016

(87) PCT Pub. No.: WO2015/146624
PCT Pub. Date: Oct. 1, 2015

(65) Prior Publication Data
US 2017/0101727 A1    Apr. 13, 2017

(30) Foreign Application Priority Data

| Mar. 28, 2014 | (JP) | 2014-068775 |
| Mar. 28, 2014 | (JP) | 2014-068777 |
| Jun. 9, 2014  | (JP) | 2014-118489 |
| Jun. 9, 2014  | (JP) | 2014-118491 |

(51) Int. Cl.
| D04C 1/02  | (2006.01) |
| D01F 6/04  | (2006.01) |
| D01D 5/04  | (2006.01) |
| B29C 55/00 | (2006.01) |
| D01D 1/02  | (2006.01) |
| D01D 5/088 | (2006.01) |
| B29K 623/00| (2006.01) |
| B29L 31/00 | (2006.01) |

(52) U.S. Cl.
CPC .............. *D01F 6/04* (2013.01); *B29C 55/005* (2013.01); *D01D 1/02* (2013.01); *D01D 5/04* (2013.01); *D01D 5/0885* (2013.01); *D04C 1/02* (2013.01); *B29K 2623/06* (2013.01); *B29L 2031/731* (2013.01)

(58) Field of Classification Search
CPC ... D04C 1/02; D04C 1/06; D04C 1/12; D07B 1/02; D07B 1/025; D01F 6/04; A01K 91/02
See application file for complete search history.

(56) References Cited

U.S. PATENT DOCUMENTS

| 5,015,525 A * | 5/1991  | Yagi ........................ D01F 6/04 264/210.8 |
| 5,749,214 A   | 5/1998  | Cook |
| 6,605,348 B1  | 8/2003  | Ohta et al. |
| 10,087,560 B2*| 10/2018 | Fukushima ............ A01K 91/00 |
| 2001/0038913 A1 | 11/2001 | Ohta et al. |
| 2003/0203202 A1 | 10/2003 | Ohta et al. |
| 2003/0203203 A1 | 10/2003 | Ohta et al. |
| 2003/0203204 A1 | 10/2003 | Ohta et al. |
| 2003/0207074 A1 | 11/2003 | Ohta et al. |
| 2003/0211321 A1 | 11/2003 | Ohta et al. |
| 2007/0148452 A1 | 6/2007  | Sakamoto et al. |
| 2011/0124835 A1 | 5/2011  | De Weijer et al. |
| 2011/0269359 A1*| 11/2011 | Tam .................... B29C 47/0014 442/181 |
| 2013/0225022 A1*| 8/2013  | Tam ........................ D02G 3/02 442/60 |
| 2016/0122918 A1*| 5/2016  | Tam ....................... D07B 1/025 87/8 |

FOREIGN PATENT DOCUMENTS

| CN | 1311831 A    | 9/2001  |
| JP | 1-256689 A   | 10/1989 |
| JP | 4-245964 A   | 9/1992  |
| JP | 4-249819 A   | 9/1992  |
| JP | 10-317289 A  | 12/1998 |
| JP | 2004-285557 A| 10/2004 |
| JP | 2004-308106 A| 11/2004 |
| JP | 2006-75158 A | 3/2006  |

(Continued)

OTHER PUBLICATIONS

Extended (supplementary) European Search Report dated Oct. 4, 2017, issued in counterpart European Application No. 15769764.0. (9 pages).
Extended (Supplementary) Search Report dated Oct. 4, 2017, issued in European Application No. 15769558.6 (10 pages).
Office Action dated Mar. 14, 2018, issued in counterpart Chinese application No. 201580017284.8, with English translation. (8 pages).
Office Action dated Apr. 10, 2018, issued in counterpart Chinese Application No. 201580017285.2, with English translation. (18 pages).

(Continued)

*Primary Examiner* — Tejash Patel
(74) *Attorney, Agent, or Firm* — Westerman, Hattori, Daniels & Adrian, LLP

(57) ABSTRACT

It is provided that a multifilament and a braid that are capable of being processed into products in a wide range of temperature and are excellent in dimensional stability and abrasion resistance. A multifilament comprising 5 or more monofilaments, wherein the multifilament contains polyethylene having an intrinsic viscosity [η] of 5.0 dL/g or more and 40.0 dL/g or less and substantially including ethylene as a repeating unit, and wherein a difference between a maximum value and a minimum value in a ratio of a diffraction peak intensity of orthorhombic crystal (200) plane to a diffraction peak intensity of orthorhombic crystal (110) plane in a monofilament cross section is 0.22 or less.

28 Claims, No Drawings

(56) References Cited

FOREIGN PATENT DOCUMENTS

| | | | |
|---|---|---|---|
| JP | 2006-89898 A | 4/2006 |
| JP | 2006-342441 A | 12/2006 |
| JP | 4141686 B2 | 8/2008 |
| JP | 2009-221774 A | 10/2009 |
| JP | 2010-148481 A | 7/2010 |
| JP | 4565324 B2 | 10/2010 |
| JP | 4565325 B2 | 10/2010 |
| JP | 2011-527387 A | 10/2011 |
| JP | 2015-193962 A | 11/2015 |
| JP | 2015-193963 A | 11/2015 |
| WO | 2009/028590 A1 | 3/2009 |

OTHER PUBLICATIONS

Notification of Reason for Rejection dated Jul. 29, 2014, issued in counterpart Japanese Patent Application No. 2014-118489, w/English translation (8 pages).
International Search Report dated Jun. 2, 2015, issued in counterpart International Application No. PCT/JP2015/057442 (2 pages).
Notification of Reason for Rejection dated Feb. 29, 2014, issued in counterpart Japanese Patent Application No. 2014-118489, w/English translation (8 pages).
Notification of Reason for Rejection dated Feb. 18, 2015, issued in counterpart Japanese Patent Application No. 2014-118491, w/English translation (10 pages).
Notification of Reason for Rejection dated Jul. 29, 2014, issued in Japanese Patent Application No. 2014-118488, w/English translation (9 pages).
Notification of Reason for Rejection dated Feb. 18, 2015, issued in Japanese Patent Application No. 2014-118490, w/English translation (7 pages).
Office Action dated Jul. 20, 2017, issued in counterpart Chinese Application No. 201580017284.8, with English translation. (17 pages).
Office Action dated Jul. 26, 2017, issued in counterpart Chinese Application No. 201580017285.2, with English translation. (18 pages).
Decision of Rejection dated Sep. 27, 2018, issued in counterpart Chinese Application No. 201580017284.8, with English translation. (15 pages).
Decision of Rejection dated Oct. 19, 2018, issued in counterpart Chinese Application No. 201580017285.2, with English translation. (16 pages).

* cited by examiner

MULTIFILAMENT AND BRAID

TECHNICAL FIELD

The present invention relates to a multifilament and a braid excellent in dimensional stability and abrasion resistance.

BACKGROUND ART

Conventionally, polyethylenes with an extremely high molecular weight, so-called ultra high molecular weight polyethylenes, have been used for many use applications since they have good properties such as impact resistance. Above all, ultra high molecular weight polyethylene fibers produced by a production method involving extruding a polyethylene solution obtained by dissolving an ultra high molecular weight polyethylene in an organic solvent by an extruder, thereafter quenching the resulting solution to form a fibrous gel body, and continuously drawing the gel body while removing the organic solvent from the gel body (hereinafter, referred to as gel spinning method) have widely been known as fibers with high strength and high elastic modulus (e.g., Patent Document 1 and Patent Document 2).

It is also known that fibers with high strength and high elastic modulus can be produced by a dry spinning method involving spinning a spinning solution obtained by evenly dissolving an ultra high molecular weight polyethylene in a volatile solvent, evaporating the solvent from the spun gel thread, then cooling the gel thread by using an inert gas, and finally drawing the gel thread at a high draw ratio (e.g., Patent Document 3).

As described above, polyethylene fibers (multifilaments) with high strength and high elastic modulus have widely been used in recent years. However, when polyethylene fibers with improved strength and elastic modulus are used for, for example, ropes and braids, designs with a less number of fibers for braiding or low titer are made possible, and this makes it possible to narrow diameters of ropes or braids; however, it results in a defect that abrasion resistance becomes poor.

Braids made of multifilaments or monofilaments are used for many use applications such as fishing lines, nets, blind cords and ropes. As use applications of these braids have been diversified, the braids are required to have functionality corresponding to required properties of products. For example, in the case of a fishing line, various properties are required in accordance with types of fish to be fished and ways for fishing. However, although fishing lines made of conventionally used ultra high molecular weight polyethylene fibers are excellent in high strength and high elastic modulus, they have a problem of being easily changeable in dimensions and physical properties because of uneven microstructure in the interior of the fibers. Accordingly, in the case of fishing lines production, there occurs the problem that not only dimensional stability is poor but also abrasion resistance, which is one of important factors as fishing lines, is poor.

In addition, when fishing lines made of ultra high molecular weight polyethylene fibers are used for a long time, the braided filaments are gradually fastened one another with the lapse of time, and the fishing lines lose flexibility that is an important factor as fishing lines, and gradually become hard. When the fishing lines become hard, dimensional change is generated, and along with the change, there occurs the problem that the physical properties change.

As a means for solving such a problem, Patent Document 4 describes a cord obtained by subjecting a braid to a heat treatment after production of the braid. The heat treatment can suppress the cord from being fluctuated in mechanical properties. However, when the cord is used as a fishing line, there occurs the problem that the braid tends to be worn and is deteriorated in throwing property as a fishing rod, due to not only the reason that a bundling property of fiber yarns constituting the braid is weak and consequently the braided fiber yarns are gradually fastened with lapse of time to change their dimensions, but also the reason that a cross-section of the fiber yarn forms a flat shape and consequently the friction between the fiber yarn and a fishing rod guide increases.

On the other hand, a braid obtained by using a twisted yarn made of various synthetic fibers or natural fibers as a core yarn and coating the core yarn with braided yarns of various fibers has conventionally been used for a blind cord to be used for lifting blinds. Since a blind cord is used for lifting blinds, it is important that the blind cord shows less dimensional change even after repeat use, and the braid is less twisted back. Further, since a blind cord is used for a long time, it is also important that the blind cord shows little change of physical properties such as expansion and contraction in relation to environmental change of temperature and humidity.

Furthermore, for large scale blinds which have been used in recent years, a blind cord is worn more severely than before by lifting such blinds. Accordingly, a conventional blind cord is hard to sufficiently exhibit functions due to low abrasion resistance and significant physical property change in the case of being used as a blind cord for large scale blinds. Accordingly, it is eagerly desired to make a blind cord available which is more excellent in performance, particularly, excellent in abrasion resistance.

PRIOR ART DOCUMENT

Patent Documents

Patent Document 1: Japanese Patent No. 4565324
Patent Document 2: Japanese Patent No. 4565325
Patent Document 3: Japanese Patent No. 4141686
Patent Document 4: JP-A-Hei 10-317289

SUMMARY OF THE INVENTION

Problems to be Solved by the Invention

An object of the present invention is to provide a multifilament and a braid that are capable of being processed into products in a wide range of temperature and are excellent in dimensional stability and abrasion resistance.

Solutions to the Problems

The present inventors have found that it is possible to obtain a multifilament excellent in abrasion resistance and having high strength and high elastic modulus by making the overall crystal structure of monofilament (single yarn) as uniform as possible.

The multifilament according to the present invention is a multifilament comprising 5 or more monofilaments, wherein the multifilament contains polyethylene having an intrinsic viscosity $[\eta]$ of 5.0 dL/g or more and 40.0 dL/g or less and substantially including ethylene as a repeating unit, and wherein a difference between a maximum value and a minimum value in a ratio of a diffraction peak intensity of orthorhombic crystal (200) plane to a diffraction peak intensity of orthorhombic crystal (110) plane in a monofilament cross section is 0.22 or less.

The coefficient of variation CV of the peak intensity ratio defined by Equation (1) below is preferably 50% or less:

Coefficient of variation CV (%)=(standard deviation of the peak intensity ratio of the monofilaments)/(average value of the peak intensity of the monofilaments)×100     (1)

The difference between a maximum value of a degree of crystal orientation and a minimum value of a degree of crystal orientation is preferably 0.010 or less in the monofilament cross section.

It is preferable that in accordance with JIS L 1095, 1000 times or more in number of reciprocating abrasions at break in an abrasion resistance test measured at a load of 5 cN/dtex, and 100 times or more in number of reciprocating abrasions at break in an abrasion resistance test measured at a load of 10 cN/dtex.

The monofilament has a titer of preferably 3 dtex or more and 40 dtex or less.

The multifilament according to the present invention has a maximum thermal stress of preferably 0.20 cN/dtex or more. The coefficient of variation CV' of initial modulus defined by Equation (2) below is preferably 30% or less:

Coefficient of variation CV'(%)=(standard deviation of initial modulus of the monofilament)/(average value of initial moduli of the monofilaments)×100     (2)

The multifilament according to the present invention has a thermal stress of preferably 0.15 cN/dtex or more at 120° C. The multifilament according to the present invention has a thermal shrinkage of preferably 0.20% or less at 70° C. and a thermal shrinkage of preferably 3.0% or less at 120° C. The multifilament according to the present invention has a tensile strength of preferably 18 cN/dtex or more and an initial modulus of preferably 600 cN/dtex or more.

The method for producing the multifilament comprises: a dissolution step of dissolving the polyethylene in a solvent to obtain a polyethylene solution; a spinning step of discharging the polyethylene solution out of a nozzle at a temperature of melting point of the polyethylene or higher and cooling a discharged yarn thread with a coolant at 10° C. or higher and 60° C. or lower; a drawing step of drawing a discharged undrawn yarn while removing the solvent; and a winding step of winding a resulting yarn at 50° C. or lower and at a tensile force of 5 cN/dtex or less, wherein the drawing step includes 1 or more and 3 or less in number of drawing step, a draw ratio is 7.0 times or more and 60 times or less, and a total drawing time is 0.5 minutes or longer and 20 minutes or shorter.

The present inventors have found that it is possible to obtain a multifilament excellent in abrasion resistance and having high strength and high elastic modulus by using multifilament made the overall crystal structure of monofilament (single yarn) as uniform as possible.

The braid of the present invention comprises a multifilament comprising 5 or more monofilaments, wherein the multifilament contains polyethylene having an intrinsic viscosity [η] of 5.0 dL/g or more and 40.0 dL/g or less and substantially including ethylene as a repeating unit, and wherein in the multifilament in a state where the braid is unbraided, a difference between a maximum value and a minimum value in a ratio of a diffraction peak intensity of orthorhombic crystal (200) plane to a diffraction peak intensity of orthorhombic crystal (110) plane in a monofilament cross section is 0.18 or less.

The coefficient of variation CV of the peak intensity ratio defined by Equation (1) below is preferably 40% or less:

Coefficient of variation CV (%)=(standard deviation of the peak intensity ratio of the monofilament)/(average value of the peak intensity of the monofilament)×100     (1)

The braid has a difference between a maximum value of a degree of crystal orientation and a minimum value of a degree of crystal orientation of preferably 0.012 or less.

The braid shows preferably 1000 times or more in number of reciprocating abrasions at break in an abrasion resistance test measured at a load of 5 cN/dtex in accordance with JIS L-1095. The abrasion resistance test measured at a load of 5 cN/dtex, a difference between a number of reciprocating abrasions of the braid and a number of reciprocating abrasions of the multifilament in a state where the braid is unbraided is preferably 320 times or less. The multifilament in the state where the braid is unbraided shows preferably 100 times or more in number of reciprocating abrasions at break in an abrasion resistance test measured at a load of 10 cN/dtex in accordance with JIS L-1095.

The braid has a thermal shrinkage of preferably 3.0% or less at 120° C. The braid has a tensile strength of preferably 18 cN/dtex or more and an initial modulus of preferably 300 cN/dtex or more. The difference between the tensile strength of the braid and the tensile strength of the multifilament in the state where the braid is unbraided is preferably 5 cN/dtex or less.

The monofilament has a titer of preferably 2 dtex or more and 40 dtex or less in the state that the braid is unbraided. The multifilament in the state that the braid is unbraided has a thermal shrinkage of preferably 0.11% or less at 70° C. and a thermal shrinkage of preferably 2.15% or less at 120° C. The multifilament in the state that the braid is unbraided has a thermal stress of preferably 0.15 cN/dtex or more at 120° C.

The method for producing the braid comprises a step of: braiding the multifilament and performing heat treatment, wherein the heat treatment is performed at 70° C. or higher; a time of the heat treatment is 0.1 seconds or longer and 30 minutes or shorter; and a tensile force of 0.02 cN/dtex or more and 15 cN/dtex or less is applied to the braid in the heat treatment.

The method for producing the braid is that a length of the braid after the heat treatment is preferably 1.05 times or more and 15 times or less as long as a length of the braid before the heat treatment by the tensile force.

The present invention includes not only a braid but also a fishing line obtained from the braid, a net obtained from the braid, and a rope obtained from the braid.

Effect of the Invention

A multifilament and a braid according to the present invention are capable of being processed into products in a wide range of temperature, show little change of mechanical properties such as thermal stress, thermal shrinkage and initial modulus in a wide range of temperature during use of the products, and are also excellent in dimensional stability. The multifilament and the braid are also high in resistance against friction and excellent in abrasion resistance even under an overload condition. Consequently, the product lives are considerably improved. Not only the amount of fluff generated along with the friction during use is significantly decreased but also the amount of fluff generated during the multifilament and the braid are processed into products is also decreased, so that the work environments can be also improved.

Accordingly, the multifilament and the braid according to the present invention exhibit excellent performance and designing properties as industrial materials such as cut resistant woven and knitted products for protection, tapes, ropes, nets, fishing lines, protection covers for materials, sheets, strings for kites, archery chords, sail cloths, curtain materials, protection materials, bulletproof materials, medical sutures, artificial tendons, artificial muscles, reinforcing materials for fiber-reinforced resins, cement reinforcing materials, reinforcing materials for fiber-reinforced rubber, machine tool components, battery separators and chemical filters.

MODE FOR CARRYING OUT THE INVENTION

<<Multifilament>>

Hereinafter, polyethylene to be used for producing a multifilament according to the present invention, and physical properties and a production method of the multifilament according to the present invention will be described.

[Polyethylene]

A multifilament according to the present invention contains polyethylene substantially comprising ethylene as a repeating unit, and more preferably contains an ultra high molecular weight polyethylene comprising a homopolymer of ethylene. The polyethylene to be used for the present invention may be not only a homopolymer of ethylene but also a copolymer of ethylene with a small amount of other monomer to an extent that the effects of the present invention can be caused. Examples of the other monomer include α-olefins, acrylic acid and its derivatives, methacrylic acid and its derivatives, vinylsilane and its derivatives, and so forth. The ultra high molecular weight polyethylene to be used for the present invention may be an ultra high molecular weight polyethylene comprising homopolymers of ethylene; or a blend of copolymers (copolymers of ethylene and other monomer (e.g., α-olefin)), of a homopolyethylene and an ethylenic copolymer, or of a homopolyethylene and other homopolymer such as α-olefin; and may be partially cross-linked or may partially have methyl branches, ethyl branches, butyl branched, and the like. Particularly, the ultra high molecular weight polyethylene may be one which is a copolymer with an α-olefin such as propylene or 1-butene and which has short chains or long chain branches at a rate of less than 20 per 1000 carbon atoms. When the ultra high molecular weight polyethylene has branches to a certain extent, it is possible to provide stability in production of the multifilament according to the present invention, particularly in spinning and drawing. However, if the ultra high molecular weight polyethylene has branches of 20 or more per 1000 carbon atoms, there are too many branch parts so that it gives an impairing factor during spinning and drawing, and thus it is not preferable. When the content of other monomer other than ethylene is too large, it conversely gives an impairing factor for drawing. Accordingly, the other monomer other than ethylene is in an amount of preferably 5.0 mol % or less, more preferably 1.0 mol % or less, furthermore preferably 0.2 mol % or less, and most preferably 0.0 mol %, that is, a homopolymer of ethylene, by monomer unit. Herein, it is to be noted that "polyethylene" includes not only a homopolymer of ethylene but also a copolymer of ethylene with a slight amount of other monomer and the like unless otherwise specified. Further, in the production of the multifilament according to the present invention, a polyethylene composition can be used in which the below-described various additives are added to polyethylene if necessary, and "polyethylene" used herein includes such a polyethylene composition.

Further, polyethylenes with different number average molecular weight or weight average molecular weight may be blended or polyethylenes with different molecular weight distribution (Mw/Mn) may be blended as long as the intrinsic viscosity of the resulting blend falls within the below-described prescribed range in measurement of the below-described intrinsic viscosity. A blend of a branched polymer and a polymer with no branch may also be used.

<Weight Average Molecular Weight>

As described above, the polyethylene to be used in the present invention is preferably an ultra high molecular weight polyethylene, and the ultra high molecular weight polyethylene has a weight average molecular weight of preferably 490000 to 6200000, more preferably 550000 to 5000000, and even more preferably 800000 to 4000000. If the weight average molecular weight is less than 490000, the multifilament may fail to have high strength and high elastic modulus even being subjected to the below-described drawing step. It is assumed that the number of molecular terminals per cross section of the multifilament is large due to low weight average molecular weight, and this fact acts as a structural defect. If the weight average molecular weight exceeds 6200000, tension becomes so high during the drawing step as to cause breakage, and production is very difficult to be performed.

The weight average molecular weight can generally be measured by GPC measurement method, but when the weight average molecular weight is high as in the polyethylene to be used for the present invention, it may not be easy to measure the weight average molecular weight by GPC measurement method because a column may be clogged during measurement. Accordingly, for the polyethylene to be used for the present invention, in place of GPC measurement method, the weight average molecular weight is calculated from a value of the intrinsic viscosity described below by employing the following equation described in "POLYMER HANDBOOK, Fourth Edition, J. Brandrup and E. H. Immergut, E. A. Grulke Ed., A JOHN WILEY & SONS, Inc Publication 1999". Weight average molecular weight=$5.365\times10^4\times$(intrinsic viscosity)$^{1.37}$ <Intrinsic Viscosity>

The polyethylene to be used for the present invention has an intrinsic viscosity of 5.0 dL/g or more, preferably 8.0 dL/g or more and 40.0 dL/g or less, preferably 30.0 dL/g or less, and more preferably 25.0 dL/g or less. If the intrinsic viscosity is less than 5.0 dL/g, any multifilament with high strength may not be obtained. On the other hand, the upper limit of the intrinsic viscosity does not particularly cause a problem as long as a multifilament with high strength can be obtained, but if the intrinsic viscosity of the polyethylene is too high, processability may be deteriorated so that a multifilament is difficult to be produced. Accordingly, the intrinsic viscosity preferably falls within the above-mentioned range.

[Titer of Monofilament]

The multifilament according to the present invention has a titer of monofilament of preferably 3 dtex or more and 40 dtex or less, more preferably 5 dtex or more and 30 dtex or less, and furthermore preferably 6 dtex or more and 20 dtex or less. The titer of monofilament of 3 dtex or more develops the abrasion resistance to a high degree. On the other hand, if the titer of monofilament exceeds 40 dtex, the strength of the multifilament is lowered and therefore it is not preferable.

[Total Titer of Multifilament]

The multifilament according to the present invention has a total titer of preferably 15 dtex or more and 7000 dtex or less, more preferably 30 dtex or more and 5000 dtex or less, and furthermore preferably 40 dtex or more and 3000 dtex or less. The total titer of 15 dtex or more develops the abrasion resistance to a high degree. On the other hand, if the total titer exceeds 7000 dtex, strength of the multifilament is lowered and therefore it is not preferable.

[Number of Monofilament]

The multifilament according to the present invention is compose of 5 or more monofilaments, preferably 10 or more monofilaments, and more preferably 15 or more monofilaments.

[Crystal Structure of Monofilament]

For the monofilament to be used for the present invention, it is preferable that the crystal structure in the interior of the monofilament is a structure substantially uniform entirely in the cross section (longitudinal vertical surface). Specifically, when a ratio of the diffraction peak intensity of orthorhombic crystal (200) plane to the diffraction peak intensity of orthorhombic crystal (110) plane (hereinafter, referred to as peak intensity ratio) is measured entirely in the monofilament cross section by using the x-ray beam described below, a difference between the maximum value of the peak intensity ratio and the minimum value of the peak intensity ratio is 0.22 or less, preferably 0.20 or less, and more preferably 0.18 or less. If the difference between the maximum value of the peak intensity ratio and the minimum value of the peak intensity ratio exceeds 0.22, it indicates that the uniformity of the crystal structure in the entire cross section is insufficient, and a multifilament comprising monofilaments each having an ununiform crystal structure tends to have low abrasion resistance and therefore it is not preferable. The lower limit of the difference between the maximum value of the peak intensity ratio and the minimum value of the peak intensity ratio is not particularly limited, but it is sufficient to be about 0.01. Hereinafter, a measurement method for the peak intensity ratio in the interior of the monofilament and a procedure for measuring the difference between the maximum value of the peak intensity ratio and the minimum value of the peak intensity ratio will be described.

The crystal structure in the interior of the monofilament can be confirmed by using an x-ray beam with half width narrower than the diameter of the monofilament through an x-ray analyzer. The diameter of the monofilament can be measured by an optical microscope or the like. When the monofilament cross section has a shape such as an ellipse, the distance between two most distant points existing on the outer circumference of the monofilament is set as a diameter, and the center point of these two points is set as the center of the monofilament. An X-ray beam with a half width of 30% or less of the diameter of the monofilament is preferably used, and an x-ray beam with a half width of 10% or less of the diameter of the monofilament is more preferably used.

The difference between the maximum value of the peak intensity ratio and the minimum value of the peak intensity ratio is measured in accordance with the following method. Each of peak intensity ratios is measured at an even interval from the center of the monofilament to a peripheral position of outer circumference of the monofilament (hereinafter, referred to as outermost point) to determine the maximum value of the peak intensity ratio and the minimum value of the peak intensity ratio, and the difference between the maximum value and the minimum value is measured. The outermost point is preferably a point apart by 30% or more of the diameter from the center of the monofilament, and more preferably a point apart by 35% or more of the diameter. The number of points for measurement of the peak intensity ratio from the center to the outermost point of the monofilament is preferably 3 or more, and more preferably 5 or more. The above-mentioned interval is preferably narrower than the half width of the x-ray beam and the above-mentioned interval is more preferably 90% or less of the half width of the x-ray beam.

The peak intensity ratio is preferably 0.01 or more and 0.48 or less, more preferably 0.08 or more and 0.40 or less, and furthermore preferably 0.15 or more and 0.35 or less at any measurement point in the interior of the monofilament. If there is a measurement point where the above-mentioned peak intensity ratio exceeds 0.48, the crystal in the interior of the monofilament extremely grows in the a-axis direction of a unit lattice of the orthorhombic crystal, and it indicates that the uniformity of the crystal structure of the entire cross section is insufficient. A multifilament comprising monofilaments each having an ununiform crystal structure may have low abrasion resistance and therefore it is not preferable.

Further, the peak intensity ratio has a coefficient of variation (CV) defined by the following equation (1) of preferably 50% or less, more preferably 40% or less, and furthermore preferably 30% or less. If the coefficient of variation CV exceeds 50%, the uniformity of the crystal structure of the entire cross section is insufficient. The lower limit of the coefficient of variation CV is not particularly limited, but it is preferably 1% or more.

Coefficient of variation CV (%)=(standard deviation of peak intensity ratio of above monofilaments)/ (average value of peak intensity ratio of above monofilaments)×100 (1)

The degree of crystal orientation in the axial direction (longitudinal direction) of the monofilament (hereinafter, referred to as degree of crystal orientation) is also measured at an even interval from the center to the outermost point of the monofilament by using the above-mentioned x-ray beam similarly to the case of the peak intensity ratio. The degree of crystal orientation is preferably 0.950 or more and more preferably 0.960 or more at any measurement point in the interior of the monofilament. If there is a measurement point at which the above-mentioned degree of crystal orientation is less than 0.950, the abrasion resistance of a multifilament comprising such a monofilament may be lowered and therefore it is not preferable. The upper limit of the degree of crystal orientation is not particularly limited, but it is substantially difficult to obtain a monofilament having a degree of crystal orientation exceeding 0.995.

The difference between the maximum value of the degree of crystal orientation and the minimum value of the degree of crystal orientation is also measured in the same manner as the difference of the maximum value of the peak intensity ratio and the minimum value of the peak intensity ratio. The difference between the maximum value of the degree of crystal orientation and the minimum value of the degree of crystal orientation is preferably 0.010 or less, and more preferably 0.007 or less. Since a monofilament having more than 0.010 of the difference between the maximum value of the degree of crystal orientation and the minimum value of the degree of crystal orientation is ununiform in the crystal structure, a multifilament comprising such a monofilament may have low abrasion resistance and therefore it is not preferable. The lower limit of the difference between the maximum value of the degree of crystal orientation and the minimum value of the degree of crystal orientation is not particularly limited, but it is sufficient to be about 0.001.
[Abrasion]

For the multifilament according to the present invention, when the surface of the multifilament is washed with hexane and ethanol at room temperature and the surface of the multifilament is then dried and subjected to an abrasion test in accordance with JIS L 1095, the number of times until break at a load of 5 cN/dtex is preferably 1000 times or more, more preferably 1500 times or more, and furthermore preferably 3000 times or more. The upper limit of the number of times until break is not particularly limited, but it is preferably 300000 times or less. On the other hand, the number of times until break at a load of 10 cN/dtex is preferably 100 times or more, more preferably 150 times or more, furthermore preferably 200 times or more, and particularly preferably 300 times or more. The upper limit of the number of times until break is not particularly limited, but it is preferably 100000 times or less.
[Thermal Stress]

The multifilament according to the present invention has a maximum thermal stress of preferably 0.20 cN/dtex or more and 5.0 cN/dtex or less, and more preferably 0.25 cN/dtex or more and 3.0 cN/dtex or less in TMA (thermomechanical analysis) measurement. If the maximum thermal stress is less than 0.20 cN/dtex, the elastic modulus of the multifilament may be low and therefore it is not preferable. On the other hand, if the maximum thermal stress exceeds 5.0 cN/dtex, the dimensional change becomes significant and therefore it is not preferable.

The multifilament of the present invention shows the maximum thermal stress measured by TMA (thermomechanical analysis) measurement at a temperature of preferably 120° C. or higher, and more preferably 130° C. or higher. If the temperature is lower than 120° C., the dimensional change becomes significant during storage at a high temperature, when a braid is dyed at a high temperature, when resin is attached at a high temperature, or when a product is washed with hot water.

The multifilament according to the present invention has a thermal stress of preferably 0.15 cN/dtex or more and 0.5 cN/dtex or less, and more preferably 0.17 cN/dtex or more and 0.4 cN/dtex or less at 120° C. in TMA (thermomechanical analysis) measurement. If the thermal stress is less than 0.15 cN/dtex at 120° C., the elastic modulus of the multifilament may be low and therefore it is not preferable.
[Thermal Shrinkage]

The multifilament according to the present invention has a thermal shrinkage of preferably 0.20% or less, more preferably 0.18% or less, and furthermore preferably 0.15% or less at 70° C. If the thermal shrinkage at 70° C. exceeds 0.20%, the dimensional change of the multifilament constituting a braid becomes significant when the braid is dyed at a high temperature, when resin is attached at a high temperature, or when a product is washed with hot water, and therefore it is not preferable. The lower limit of the thermal shrinkage is not particularly limited, but it is preferably 0.01% or more. The multifilament according to the present invention has a thermal shrinkage of preferably 3.0% or less, more preferably 2.9% or less, and furthermore preferably 2.8% or less at 120° C. The lower limit of the thermal shrinkage is not particularly limited, but it is preferably 0.01% or more. If the thermal shrinkage at 120° C. exceeds 3.0%, the dimensional change of the multifilament constituting a braid becomes significant and therefore it is not preferable when the braid is dried at temperature as high as 120° C. in the drying step after washing of a product. When the braid is dyed at a high temperature or when a product is washed with hot water, the dimensional change of the multifilament constituting the braid becomes significant and therefore it is not preferable. The lower limit of the thermal shrinkage is not particularly limited, but it is preferably 0.01% or more The thermal shrinkage of the multifilament at 70° C. or 120° C. means the thermal shrinkage of the multifilament at 70° C. or 120° C. in the longitudinal direction.
[Tensile Strength]

The multifilament according to the present invention has a tensile strength of preferably 18 cN/dtex or more, more preferably 20 cN/dtex or more, and furthermore preferably 21 cN/dtex or more. The multifilament according to the present invention has the above-mentioned tensile strength even if the titer of the monofilament is made large, and can be developed for use applications for which abrasion resistance and dimensional stability are required which could not have been developed by a conventional multifilament or a conventional braid. The tensile strength is preferably higher, and the upper limit of the tensile strength is not particularly limited, but a multifilament with a tensile strength of, for example, more than 85 cN/dtex is difficult to be produced technically and industrially. A measurement method for tensile strength will be described below.
[Elongation at Break]

The multifilament according to the present invention has an elongation at break of preferably 3.0% or more, more preferably 3.4% or more, furthermore preferably 3.7% or more and preferably 7.0% or less, more preferably 6.0% or less, and furthermore preferably 5.0% or less. If the elongation at break is less than 3.0%, the monofilament is easily cut even by slight strain or tends to be fluffed easily during use of a product or being processed into a product and therefore it is not preferable. On the other hand, if the elongation at break exceeds 7.0%, the dimensional stability is deteriorated and therefore it is not preferable. A measurement method for elongation at break will be described below.
[Initial Modulus]

The multifilament according to the present invention has an initial modulus of preferably 600 cN/dtex or more and 1500 cN/dtex or less. When the multifilament has the initial modulus as described above, changes in physical properties and shape hardly occur against the external force applied during use of a product or at a step for processing the multifilament into a product. The initial modulus is more preferably 650 cN/dtex or more, furthermore preferably 680 cN/dtex or more, and more preferably 1400 cN/dtex or less, furthermore preferably 1300 cN/dtex or less, and particularly preferably 1200 cN/dtex or less. If the initial modulus exceeds 1500 cN/dtex, the flexibility of the yarn is deteriorated because of the high elastic modulus and therefore it is not preferable. A measurement method for initial modulus will be described below.
[Coefficient of Variation of Initial Modulus in Monofilament Constituting Multifilament]

For the initial modulus, the monofilament constituting the multifilament according to the present invention has a coefficient of variation CV' defined by the following equation (2) of preferably 30% or less, more preferably 25% or less, and furthermore preferably 20% or less. If the coefficient of variation CV' indicating variation of the initial modulus of the monofilament exceeds 30%, not only the strength of the multifilament constituted by the monofilament is lowered but also the abrasion resistance is worsened and therefore it is not preferable. The lower limit of the coefficient of variation is not particularly limited, but it is preferably 0.5 or more.

Coefficient of variation CV'(%)=(standard deviation of initial modulus of monofilament constituting multifilament)/(average value of initial moduli of monofilament constituting multifilament)× 100      (2)

[Production Method]

A production method for obtaining the multifilament according to the present invention is preferably a gel spinning method. Specifically, a method for producing the multifilament according to the present invention preferably includes a dissolution step of dissolving polyethylene in a solvent to obtain a polyethylene solution; a spinning step of jetting the polyethylene solution out of a nozzle at a temperature of the melting point of the polyethylene or higher and cooling the jetted yarn thread with a coolant at 10° C. or higher and 60° C. or lower; a drawing step of drawing the jetted undrawn yarn while removing the solvent; and a winding step of winding the resulting yarn at 50° C. or lower and at a tensile force of 5 cN/dtex or less.

<Dissolution Step>

A polyethylene with high molecular weight is dissolved in a solvent to produce a polyethylene solution. The solvent is preferably a volatile organic solvent such as decalin or tetralin, or a solvent which is a solid at normal temperature or non-volatile. The concentration of the polyethylene in the above-mentioned polyethylene solution is preferably 30 mass % or less, more preferably 20 mass % or less, and furthermore preferably 15 mass % or less. It is necessary to select the optimum concentration depending on the intrinsic viscosity [η] of the polyethylene as a raw material.

As a method for producing the above-mentioned polyethylene solution, various methods may be employed. For example, the polyethylene solution can be produced by using a biaxial screw extruder or by suspending a solid polyethylene in a solvent and successively stirring the suspension at a high temperature. In this case, the mixing condition is preferably 1 minute or longer and 80 minutes or shorter in a temperature range from 150° C. or higher to 200° C. or lower. If the mixing condition is shorter than 1 minute, the mixing may be incomplete and it is therefore not preferable. On the other hand, if the time exceeds 80 minutes in the temperature range from 150° C. or higher to 200° C. or lower, breakage or crosslinking of polyethylene molecules occurs frequently to an extent that the breakage or crosslinking occurs beyond a spinnable range. Accordingly, even if a multifilament composed of at least 5 monofilaments each having a titer of monofilament of 3 dtex or more is produced, it is difficult that the multifilament can be provided with high strength and high elastic modulus as well as dimensional stability simultaneously. Depending on the molecular weight and concentration of the polymer, mixing at a temperature over 200° C. is required, but the mixing time in a temperature range over 200° C. is preferably 30 minutes or shorter. If the time exceeds 30 minutes, breakage or crosslinking of polyethylene molecules occurs frequently to an extent that the breakage or crosslinking occurs beyond a spinnable range. Accordingly, even if a multifilament composed of at least 5 monofilaments each having a titer of monofilament of 3 dtex or more is produced, it is difficult that the multifilament can be provided with high strength and high elastic modulus as well as dimensional stability simultaneously. The above-mentioned spinnable range means that spinning is possible at 10 nm/minute or more, and the spinning tension at this time is 0.01 cN or more and 300 cN or less per monofilament.

<Spinning Step>

The polyethylene solution produced by high temperature stirring or a biaxial screw extruder is extruded through an extruder or the like at a temperature preferably higher than the molting point of the polyethylene by 10° C. or higher, more preferably higher than the molting point of the polyethylene by 20° C. or higher, and furthermore preferably higher than the molting point of the polyethylene by 30° C. or higher, and then supplied to a spinneret (spinning nozzle) with use of a quantitative supply apparatus. The time taken to allow the polyethylene solution to pass through the orifice of the spinneret is preferably 1 second or longer and 8 minutes or shorter. If the time is shorter than 1 second, the flow of the polyethylene solution in the orifice is disordered so that the polyethylene solution cannot be discharged stably and therefore it is not preferable. Further, the disorder of the flow of the polyethylene solution causes an effect to make the entire structure of the monofilament uneven and therefore it is not preferable. On the other hand, if the time exceeds 8 minutes, polyethylene molecules are discharged while being scarcely oriented, and the spinning tension range per monofilament tends to be out of the above-mentioned range and therefore it is not preferable. Further, the crystal structure of the monofilament to be obtained becomes uneven and as a result, the abrasion resistance cannot be developed and therefore it is not preferable.

A yarn thread is formed by allowing the polyethylene solution to pass through a spinneret having a plurality of orifices arranged in a raw. During producing a yarn thread by spinning the polyethylene solution, the temperature of the spinneret is required to be equal to or higher than the polyethylene dissolution temperature, and preferably 140° C. or higher and more preferably 150° C. or higher. The polyethylene dissolution temperature depends on the solvent selected, the concentration of the polyethylene solution, and the mass concentration of the polyethylene, and naturally, the temperature of the spinneret is set to be lower than the thermal decomposition temperature of the polyethylene.

Next, the polyethylene solution is discharged preferably at a discharge amount of 0.1 g/minute or more out of a spinneret having a diameter of 0.2 to 3.5 mm (more preferably diameter of 0.5 to 2.5 mm). In this case, the spinneret temperature is preferably set to be higher than the melting point of the polyethylene by 10° C. or higher and lower than the boiling point of the solvent used. In a temperature range near the melting point of the polyethylene, the viscosity of the polymer is too high, and therefore the yarn thread cannot be taken at fast speed. Further, in the temperature equal to or higher than the boiling point of the solvent used, the solvent is boiled immediately after the yarn thread comes out the spinneret so that yarn breakage frequently occurs directly under the spinneret and therefore it is not preferable. In order to make a multifilament composed of 5 or more monofilaments, the spinneret is provided with 5 or more orifices. The spinneret is preferably provided with 7 or more orifices.

In the surface side of the spinneret (polyethylene solution discharge side), fine pores (one end part of orifice) for discharging the polyethylene solution are formed in the same number as the number of the orifices, and it is preferable that the discharge amount of the polyethylene solution out of each fine pore is as even as possible. For achieving this, it is important that a shear solution of the polyethylene solution to be discharged out of the respective fine pores is uniform among the fine pores. Since a temperature at a fine pore part significantly affects the shear viscosity, a temperature difference among the fine pores is preferably small. Specifically, the coefficient of variation CV" of the discharge amount in each fine pore ((standard deviation of discharge amount in all fine pores formed in spinneret)/(average value of discharge amount in all fine pores formed in spinneret)×100) is preferably 20% or less, and more preferably 18% or less. For setting the coefficient of variation CV" to be in the range as described above, a difference between the highest temperature in the fine pore and the lowest temperature in the fine pore is preferably 10° C. or lower, and more preferably 8° C. or lower. A method for making the difference between the highest temperature in the fine pore and the lowest temperature in the fine pore small is not particularly limited, but it is preferable that the spinneret is shielded so as not to be in direct contact with the outside air, and an example thereof includes a method for shielding the spinneret from the outside air by a shielding plate made of heat insulating glass. This shielding plate not only makes the spinneret part temperature even but also gives a uniform yarn thread since the fibrous yarn thread passing through the inside of the shielding plate is deformed while being subjected to even temperature hysteresis. For this purpose, not only it is important that the shielding plate shields the spinneret from the outside air but also it is important that a difference between the distance from the shielding plate to the fine pore nearest to the shielding plate and the distance from the shielding plate to the fine pore farthest to the shielding plate is made small as much as possible. By setting the above-mentioned distance difference to be small as much as possible, the above-mentioned temperature difference among the fine pores can be made smaller, and the temperature difference in the space directly under the fine pores can also be made small. As a result, when the polyethylene-discharged yarn discharged evenly is deformed in a space between the spinneret and the below-described cooling medium, the yarn is subjected to more uniform temperature hysteresis and deformation. In this case, the polyethylene molecular chains existing in the interior of the polyethylene-discharged yarn are evenly oriented in the deformation direction among the fine pores, and the coefficient of variation of the initial modulus in the polyethylene fibers to be obtained can be made small.

As described above, when the titer of monofilament to be obtained is made even by making the difference of the discharge among the fine pores small, as well as the deformation condition and also the cooling condition after discharge of the yarn thread out of the fine pore are made even, it is possible to make the coefficient of variation of the elastic modulus small and further to make the crystal orientation in the interior of the monofilament even among the monofilaments. Owing to this effect, the abrasion resistance performance under high load condition can considerably be improved.

The atmosphere after the yarn thread is discharged out of the fine pores until the yarn thread is cooled with a coolant is not particularly limited, but preferably filled with an inert gas such as nitrogen or helium.

Next, while being cooled with a cooling medium, the discharged yarn thread is taken at a speed of preferably 800 m/minute or less, and more preferably 200 m/minute or less. In this case, the quenching temperature of the cooling medium is preferably 10 to 60° C., and more preferably 12° C. or higher and 35° C. or lower. If the coolant temperature is out of this range, the tensile strength of the multifilament is more drastically decreased as the titer of monofilament becomes thicker and therefore it is not preferable. A cause for this is supposed as follows. It is preferable that the crystal structure of the entire monofilament is made uniform as much as possible to keep high strength and high elastic modulus even when the titer of monofilament is made thick. However, if the quenching temperature of the cooling medium is too low, cooling of the periphery of the cross section center part of the monofilament cannot catch up with cooling of the periphery of the outside surface of the monofilament, and the crystal structure of the entire monofilament becomes ununiform. On the other hand, if the quenching temperature of the cooling medium is too high, a difference between the cooling speed in the periphery of the cross section center part of the monofilament and the cooling speed in the periphery of the outside surface of the monofilament is made small, but the time required for the cooling is so long as to cause a structure change in a spun and undrawn yarn, and thus the crystal structure in the periphery of the cross section center part of the monofilament tends to be different from that in the periphery of the outside surface of the monofilament. For this reason, the strength of the monofilament is lowered, and consequently, the strength of the multifilament is also lowered. The cooling medium may be either a miscible liquid that is miscible with the solvent in the polyethylene solution or an immiscible liquid such as water that is not miscible with the solvent in the polyethylene solution.

The time from the termination of the cooling to removal of the solvent existing in the yarn is preferably short. Specifically, it is preferable to remove the solvent quickly after the cooling. The detail of the removal of the solvent will be described below. With respect to the time taken to remove the solvent, the time taken until the amount of the solvent remaining in the multifilament becomes 10% or less is preferably within 10 hours, more preferably within 2 hours, and furthermore preferably within 30 minutes. If the time taken to remove the solvent exceeds 10 hours, the difference between the crystal structure formed in the periphery of the cross section center part of the monofilament and the crystal structure formed in the periphery of the outside surface of the monofilament becomes significant, and the crystal structure of the entire monofilament becomes ununiform and therefore it is not preferable.

<Drawing Step>

After the undrawn yarn taken in the spinning step is continuously or temporarily wound up, a drawing step is carried out. In the drawing step, the undrawn yarn obtained by cooling is drawn several times while being heated. The drawing may be carried out once or separately a plurality of times, but preferably once or more and three times or less. Further, the undrawn yarn may be drawn in one or more steps after being heat-dried. The drawing step may be carried out in a heat medium atmosphere or by using a heating roller. Examples of the medium include the air, an inert gas such as nitrogen, steam, a liquid medium, and so forth.

Furthermore, it is required to remove the solvent from the undrawn yarn, and the drawing may be carried out while solvent removal is carried out or solvent removal may be carried out separately from the drawing step. As a solvent removal means, the above-mentioned heating method may be employed in the case of a volatile solvent, but an extraction method using an extractant may be employed when a non-volatile solvent is used. Examples of the extractant that can be used include chloroform, benzene, trichlorofluoroethane (TCTFE), hexane, heptane, nonane, decane, ethanol, a higher alcohol, and so forth.

The draw ratio of the undrawn yarn is preferably 7.0 times or more and 60 times or less, more preferably 8.0 times or more and 55 times or less, and furthermore preferably 9.0 times or more and 50 times or less, as a total draw ratio in both cases of one stage drawing and multistage drawing. Further, the drawing is preferably carried out at a temperature equal to or lower than the melting point of the polyethylene. When the drawing is carried out a plurality of stages, it is preferable that the temperature during drawing is higher as a later drawing stage. The drawing temperature in the last stage of the drawing is preferably 80° C. or higher and 160° C. or lower, and more preferably 90° C. or higher and 158° C. or lower. The condition of a heating apparatus may be set so as to keep the yarn in the above-mentioned drawing temperature range during drawing. The temperature of the yarn may be measured by using, for example, an infrared camera (FLIR SC640, manufactured by FLIR Systems).

The drawing time for the undrawn yarn, that is, the time required to deform the yarn into a multifilament is preferably 0.5 minutes or longer and 20 minutes or shorter, more preferably 15 minutes or shorter, and furthermore preferably 10 minutes or shorter. When the deformation into the multifilament exceeds 20 minutes, the molecular chains are relaxed during the drawing even if the production conditions other than the drawing time are set to be within preferable ranges, so that the strength of the monofilament is lowered and therefore it is not preferable.

The deformation rate during drawing is preferably 0.001 $s^{-1}$ or more and 0.8 $s^{-1}$ or less. It is furthermore preferably 0.01 $s^{-1}$ or more and 0.1 $s^{-1}$ or less. The deformation rate can be calculated from the draw ratio of the multifilament, the draw speed, and the length of draw interval. That is, deformation rate ($s^{-1}$)=draw speed/{draw interval×(draw ratio−1)}. If the deformation rate is too high, the multifilament is broken before a sufficient draw ratio is achieved and therefore it is not preferable. On the other hand, if the deformation rate of the multifilament is too slow, the molecular chains are relaxed during the drawing so that a multifilament with high strength and high elastic modulus cannot be obtained. Accordingly, the tensile strength and the initial modulus may be low when the multifilament is formed into a braid and therefore it is not preferable.

<Winding Step>

The drawn yarn is wound preferably within 10 minutes, more preferably within 8 minutes, and furthermore preferably within 5 minutes after completion of drawing. Further, the drawn yarn is wound with a tension of preferably 0.001 cN/dtex or more and 5 cN/dtex or less, and more preferably 0.05 cN/dtex or more and 3 cN/dtex or less. When the drawn yarn is wound with the tension in the above-mentioned ranges within the time, it is possible to wind the drawn yarn in a state that the residual strain in the cross sectional direction of the multifilament is maintained. If the tension during winding is less than 0.001 N/dtex, the residual strain is small and the stress distribution in the cross sectional direction is unstable so that a difference in residual strain is generated between an inner layer and an outer layer in each monofilament constituting the multifilament. On the other hand, if the winding tension is more than 5.0 cN/dtex, the monofilament constituting the multifilament tends to be cut and therefore it is not preferable.

The temperature during winding is preferably 50° C. or lower, and more preferably 5° C. or higher and 45° C. or lower. If the temperature during winding exceeds 50° C., the residual strain fixed in the above-mentioned cooling step may be relaxed and therefore it is not preferable.

[Others]

In order to give other functions, additives such as an antioxidant and a reduction inhibitor as well as a pH adjusting agent, a surface tension reduction agent, a thickener, a moisturizing agent, a color-deepening agent, an antiseptic, an antifungal agent, an antistatic agent, a pigment, mineral fibers, other organic fibers, metal fibers, a sequestrant, and so forth may be added during producing the multifilament according to the present invention.

The multifilament according to the present invention can be used for industrial materials such as cut resistant woven and knitted products for protection, tapes, ropes, nets, fishing lines, protection covers for materials, sheets, strings for kites, archery chords, sail cloths, curtain materials, protection materials, bulletproof materials, medical sutures, artificial tendons, artificial muscles, reinforcing materials for fiber-reinforced resins, cement reinforcing materials, reinforcing materials for fiber-reinforced rubber, machine tool components, battery separators and chemical filters.

<<Braid>>

A braid according to the present invention contains a multifilament excellent in dimensional stability and abrasion resistance (hereinafter, referred to as highly functional multifilament), and preferably contains the above-mentioned multifilament according to the present invention. The following will describe a production method for the braid according to the present invention using a highly functional multifilament and the physical properties of the braid, as well as the physical properties of the highly functional multifilament in a state that the braid according to the present invention is unbraided.

The physical properties of the braid according to the present invention will be described below.

[Tensile Strength of Braid]

The braid according to the present invention has a tensile strength of preferably 18 cN/dtex or more, more preferably 20 cN/dtex or more, and furthermore preferably 21 cN/dtex or more. The braid has the above-mentioned tensile strength even if the titer of the monofilament is made large, and can be developed for use applications for which abrasion resistance and dimensional stability are required which could not have been developed by a conventional braid comprising a conventional multifilament. The tensile strength is preferably higher, and the upper limit of the tensile strength is not particularly limited, but a braid with a tensile strength of, for example, more than 85 cN/dtex is difficult to be produced technically and industrially. A measurement method for tensile strength will be described below.

[Abrasion of Braid]

For the braid according to the present invention, when the surface of the braid is washed with an organic solvent and then dried and subjected to an abrasion test in accordance with JIS L 1095, the number of times until break at a load of 5 cN/dtex is preferably 1000 times or more, more preferably 1500 times or more, and furthermore preferably 3000 times or more. The upper limit of the number of times until break is not particularly limited, but it is preferably 300000 times or less.

[Thermal Shrinkage of Braid]

The braid according to the present invention has a thermal shrinkage of preferably 3.0% or less, more preferably 2.9% or low, and furthermore preferably 2.8% or less at 120° C. If the thermal shrinkage at 120° C. exceeds 3.0%, the dimensional change of the braid becomes significant when the braid is dried at temperature as high as 120° C. to remove water adhering to a product after the product is washed, and therefore it is not preferable. When the braid is dyed at a high temperature or when a product is washed with hot water, the dimensional change of the braid becomes significant and therefore it is not preferable. The lower limit is not particularly limited, but it is preferable to be 0.01% or more. The thermal shrinkage of the braid at 120° C. means the thermal shrinkage of the braid at 120° C. in the longitudinal direction.

[Elongation of Braid at Break]

The braid according to the present invention has an elongation at break of preferably 3.0% or more, more preferably 3.4% or more, furthermore preferably 3.7% or more and preferably 7.0% or less, more preferably 6.0% or less, and furthermore preferably 5.096 or less. If the elongation at break is less than 3.0%, the monofilament is easily cut even by slight strain or tends to be fluffed easily during use of a product or being processed into a product and therefore it is not preferable. On the other hand, if the elongation at break exceeds 7.0%, the dimensional stability is deteriorated and therefore it is not preferable. A measurement method for elongation at break will be described below.

[Initial Modulus of Braid]

The braid according to the present invention has an initial modulus of preferably 300 cN/dtex or more and 1500 cN/dtex or less. When the braid has the initial modulus as described above, changes in physical properties and shape hardly occur against the external force applied during use of a product or at a step for processing the multifilament into a product. The initial modulus is more preferably 350 cN/dtex or more, furthermore preferably 400 cN/dtex or more, and more preferably 1400 cN/dtex or less, furthermore preferably 1300 cN/dtex or less, and particularly preferably 1200 cN/dtex or less. If the initial modulus exceeds 1500 cN/dtex, the flexibility of the yarn is deteriorated because of the high elastic modulus and therefore it is not preferable. A measurement method for initial modulus will be described below.

The braid of the present invention is preferably a braid obtained by braiding 3 or more multifilaments, and more preferably a braid obtained by braiding 3 or more and 16 or less multifilaments. If the number of the multifilaments is 2 or less, a braid form cannot be obtained, and even if a braid form is obtained, the contact surface area of the multifilaments with a guide part of a braiding apparatus is large, and as a result, the abrasion resistance of the braid may be lowered and the smoothness of the braid may be deteriorated when the braid is moved.

Among the multifilaments constituting the braid according to the present invention, it is preferable that at least one is a highly functional multifilament, it is more preferable that 3 or more are highly functional multifilaments, and it is furthermore preferable that all are highly functional multifilaments. When a highly functional multifilament is used as the multifilament constituting the braid, a braid to be obtained has high strength and high elastic modulus and it is possible to reduce the fluctuation of dimensional stability and the fluctuation of physical properties with the lapse of time.

When at least one multifilament is a highly functional multifilament, the remaining multifilaments may be fibers of other materials, for example, polyester fibers, polyamide fibers, liquid crystal polyester fibers, polypropylene fibers, acrylic fibers, aramid fibers, metal fibers, inorganic fibers, natural fibers, recycled fibers, or composite fibers of these. It is more preferable that those other than one high strength polyethylene fiber are all multifilaments, but monofilaments may be contained. The filaments other than high strength polyethylene fibers may be composites of short fibers and long fibers, and also the filaments themselves may be split yarns produced by splitting a tape-like or ribbon-like molded body. The cross sectional shape of the monofilament of the respective multifilaments or monofilaments may be a circle or a form other than circle such as an oval, and hollow filaments, flat filaments or the like may be used. The respective multifilaments or monofilaments may be partially or entirely colored or melt-bonded.

The braid of the present invention has a braiding angle of preferably 6 to 35°, more preferably 15 to 30°, and furthermore preferably 18 to 25°. If the braiding angle is less than 6°, the form of the braid becomes unstable and the cross section of the braid tends to be flat easily. Further, the braid is provided with low stiffness, is easily bent, and is deteriorated in handling property. If the braiding angle exceeds 35°, the form of the braid is stabilized, but on the other hand, the tensile strength of the braid is lower than that of the raw yarns. However, in the present invention, the braiding angle of the braid is not limited to the range from 6 to 35°.

[Braid Production Method]

The Braid May be Braided by Using a Conventionally Known Braider (braiding machine). The method for braiding is not particularly limited, but may be flat-braiding, round-braiding, square-braiding, or the like. It is preferable that the multifilaments are braided and then the resulting braid is subjected to a heat treatment step.

<Heat Treatment>

The above-mentioned heat treatment is carried out at preferably 70° C. or higher, more preferably 90° C. or higher, and furthermore preferably 100° C. or higher and 160° C. or lower. If the temperature of the heat treatment is lower than 700° C., this temperature is almost equal to or lower than the crystal dispersion temperature of the polyethylene constituting the highly functional multifilament so that the residual strain of the multifilament in the cross sectional direction is relaxed, and therefore it is not preferable. On the other hand, if the heat treatment temperature exceeds 160° C., not only breakage of the braid occurs easily but also it is not possible to obtain desired mechanical properties of the braid and therefore it is not preferable.

The heat treatment is carried out for preferably 0.1 seconds or longer and 30 minutes or shorter, more preferably 0.5 seconds or longer and 25 minutes or shorter, and furthermore preferably 1.0 second or longer and 20 minutes or shorter. When the treatment time is shorter than 0.1 seconds, the residual strain of the multifilament in the cross sectional direction is relaxed and therefore it is not preferable. On the other hand, if the heat treatment time exceeds 30 minutes, not only breakage of the braid occurs easily but also it becomes impossible to obtain desired mechanical properties of the braid and therefore it is not preferable.

The tension applied to the braid during the above-mentioned heat treatment is preferably 0.02 cN/dtex or more and 15 cN/dtex or less, more preferably 0.03 cN/dtex or more and 12 cN/dtex or less, and furthermore preferably 0.05 cN/dtex or more and 8 cN/dtex or less. If the tension applied to the braid during the above-mentioned heat treatment is more than 15 cN/dtex, even if the braid may be broken or may not be broken during the heat treatment, the physical properties of the braid to be obtained may be lowered and the physical properties may be fluctuated (the number of reciprocating abrasion is decreased) with the lapse of time, and therefore it is not preferable.

A drawing step is carried out during production of the highly functional multifilament, and the drawing may be carried out during the heat treatment (hereinafter, drawing during the heat treatment may be referred to as re-drawing). The draw ratio in re-drawing (ratio of length of braid after heat treatment to length of braid before heat treatment) is preferably 1.05 times or more and 15 times or less, and more preferably 1.5 times or more and 10 times or less. If the draw ratio in the re-drawing is less than 1.05 times, the braid is loosened in the heat treatment so that the heat treatment cannot be carried out evenly. Accordingly, unevenness of the physical properties becomes significant in the longitudinal direction and therefore it is not preferable. On the other hand, if the draw ratio in the re-drawing exceeds 15 times, the highly functional multifilament constituting the braid is broken and therefore it is not preferable.

A method for heat during heat treatment is not particularly limited. Examples of the method include, but are not limited to, hot water bath in which resin is dispersed or dissolved in water, oil bath, hot roller, radiation panel, steam jet, a hot pin and the like. After or during the braid processing step, the braid may be twisted, mixed with resin, or colored if necessary.

[Physical Properties of Highly Functional Multifilament in State that Braid is Unbraided]

The following will describe the physical properties of the highly functional multifilament in a state that the braid according to the present invention is unbraided.

[Crystal Structure of Monofilament in Highly Functional Multifilament in State that Braid is Unbraided]

For the monofilament in the highly functional multifilament in a state that the braid is unbraided, it is preferable that the crystal structure in the interior of the monofilament is a structure substantially uniform entirely in the cross section (longitudinal vertical surface). Specifically, for the monofilament in the highly functional multifilament in a state that the braid is unbraided, when a ratio of the diffraction peak intensity of orthorhombic crystal (200) plane to the diffraction peak intensity of orthorhombic crystal (110) plane (hereinafter, referred to as peak intensity ratio) is measured entirely in the monofilament cross section by using the x-ray beam described below, a difference between the maximum value of the peak intensity ratio and the minimum value of the peak intensity ratio is 0.18 or less, preferably 0.15 or less, and more preferably 0.12 or lower. If the difference between the maximum value of the peak intensity ratio and the minimum value of the peak intensity ratio exceeds 0.18, it indicates that the uniformity of the crystal structure in the entire cross section is insufficient and therefore it is not preferable. The lower limit of the difference between the maximum value of the peak intensity ratio and the minimum value of the peak intensity ratio is not particularly limited, but it is sufficient to be about 0.01. A measurement method for the peak intensity ratio in the interior of the monofilament and a procedure for measuring the difference between the maximum value of the peak intensity ratio and the minimum value of the peak intensity ratio are as described above.

The peak intensity ratio is preferably 0.01 or more and 0.48 or less, more preferably 0.08 or more and 0.40 or less, and furthermore preferably 0.15 or more and 0.35 or less at any measurement point in the interior of the monofilament. If there is a measurement point where the above-mentioned peak intensity ratio exceeds 0.48, the crystal in the interior of the monofilament extremely grows in the a-axis direction of a unit lattice of the orthorhombic crystal, and it indicates that the uniformity of the crystal structure of the entire cross section is insufficient and therefore it is not preferable.

Further, the peak intensity ratio has a coefficient of variation (CV) defined by the above equation (1) of preferably 40% or less, more preferably 35% or less, and furthermore preferably 30% or less. If the coefficient of variation CV exceeds 40%, the uniformity of the crystal structure of the entire cross section is insufficient. The lower limit of the coefficient of variation CV is not particularly limited, but it is preferably 1% or more.

The degree of crystal orientation in the axial direction (longitudinal direction) of the monofilament in the highly functional multifilament in a state that the braid is unbraided (hereinafter, referred to as degree of crystal orientation) is also measured at an even interval from the center to the outermost point of the monofilament by using the above-mentioned x-ray beam similarly to the case of the peak intensity ratio. The degree of crystal orientation is preferably 0.950 or more and more preferably 0.960 or more at any measurement point in the interior of the monofilament. The upper limit of the degree of crystal orientation is not particularly limited, but it is substantially difficult to obtain a monofilament having a degree of crystal orientation exceeding 0.995.

The difference between the maximum value of the degree of crystal orientation and the minimum value of the degree of crystal orientation is also measured in the same manner as the difference of the maximum value of the peak intensity ratio and the minimum value of the peak intensity ratio. The difference between the maximum value of the degree of crystal orientation and the minimum value of the degree of crystal orientation is preferably 0.012 or less and more preferably 0.010 or less. Since a monofilament having more than 0.012 of the difference between the maximum value of the degree of crystal orientation and the minimum value of the degree of crystal orientation is ununiform in the crystal structure and therefore it is not preferable. The lower limit of the difference between the maximum value of the degree of crystal orientation and the minimum value of the degree of crystal orientation is not particularly limited, but it is sufficient to be about 0.001.

[Titer of Monofilament in Highly Functional Multifilament in State that Braid is Unbraided]

The highly functional multifilament in a state that the braid according to the present invention is unbraided has a titer of monofilament of preferably 2 dtex or more and 40 dtex or less, more preferably 5 dtex or more and 30 dtex or less, and furthermore preferably 6 dtex or more and 20 dtex or less. The titer of monofilament of 2 dtex or more develops the abrasion resistance to a high degree. On the other hand, if the titer of monofilament exceeds 40 dtex, the strength of the multifilament is lowered and therefore it is not preferable.

[Total Titer of Highly Functional Multifilament in State that Braid is Unbraided]

The highly functional multifilament in a state that the braid according to the present invention is unbraided has a total titer of preferably 15 dtex or more and 7000 dtex or less, more preferably 30 dtex or more and 5000 dtex or less, and furthermore preferably 40 dtex or more and 3000 dtex or less. The total titer of 15 dtex or more develops the abrasion resistance to a high degree. On the other hand, if the total titer exceeds 7000 dtex, strength of the multifilament is lowered and therefore it is not preferable.

[Abrasion of Highly Functional Multifilament in State that Braid is Unbraided]

For the highly functional multifilament in a state that the braid according to the present invention is unbraided, when the surface of the multifilament is washed with an organic solvent and then dried and subjected to an abrasion test in accordance with JIS L 1095, the number of times until break at a load of 5 cN/dtex is preferably 1000 times or more, more preferably 1500 times or more, and furthermore preferably 3000 times or more. The upper limit of the number of times until break is not particularly limited, but it is preferably 300000 times or less. On the other hand, the number of times until break at a load of 10 cN/dtex is preferably 100 times or more, more preferably 150 times or more, furthermore preferably 200 times or more, and particularly preferably 300 times or more. The upper limit of the number of times until break is not particularly limited, but it is preferably 100000 times or less.

In the abrasion resistance test measured at a load of 5 cN/dtex, a difference between the number of reciprocating abrasions of the above-mentioned braid and the number of reciprocating abrasions of the above-mentioned multifilament in a state that the braid is unbraided is preferably 320 times or less, more preferably 300 times or less, and furthermore preferably 250 times or less.

[Thermal Stress of Highly Functional Multifilament in State that Braid is Unbraided]

The highly functional multifilament in a state that the braid according to the present invention is unbraided has a thermal stress of preferably 0.15 cN/dtex or more and 0.5 cN/dtex or less, and more preferably 0.17 cN/dtex or more and 0.4 cN/dtex or less at 120° C. in TMA (thermomechanical analysis) measurement. If the thermal stress is less than 0.15 cN/dtex at 120° C., the elastic modulus of the multifilament may be low and therefore it is not preferable.

[Thermal Shrinkage of Highly Functional Multifilament in State that Braid is Unbraided]

The highly functional multifilament in a state that the braid according to the present invention is unbraided has a thermal shrinkage of preferably 0.11% or less, and more preferably 0.10% or less at 70° C. If the thermal shrinkage at 70° C. exceeds 0.11%, the dimensional change of the multifilament constituting the braid becomes significant when the braid is dyed at a high temperature or when a product is washed with hot water, and therefore it is not preferable. The lower limit of the thermal shrinkage is not particularly limited, but it is preferably 0.01% or more. On the other hand, the highly functional multifilament in a state that the braid according to the present invention is unbraided has a thermal shrinkage of preferably 2.15% or less, and more preferably 2.10% or less at 120° C. If the thermal shrinkage at 120° C. exceeds 2.15%, the dimensional change of the multifilament constituting the braid becomes significant when the braid is dried at temperature as high as 120° C. to dry out water adhering to a product in a short time after the product is washed, and therefore it is not preferable. When the braid is dyed at a high temperature or when a product is washed with hot water, the dimensional change of the braid becomes significant and therefore it is not preferable. The lower limit is not particularly limited, but it is preferable to be 0.01% or more. The thermal shrinkage of the highly functional multifilament in a state that the braid is unbraided at 70° C. or 120° C. means the thermal shrinkage of the multifilament at 70° C. or 120° C. in the longitudinal direction.

[Tensile Strength of Highly Functional Multifilament in State that Braid is Unbraided]

The highly functional multifilament in a state that the braid according to the present invention is unbraided has a tensile strength of 18 cN/dtex or more, preferably 20 cN/dtex or more, and more preferably 21 cN/dtex or more. The highly functional multifilament has the above-mentioned tensile strength even if the titer of the monofilament is made large, and can be developed for use applications for which abrasion resistance and dimensional stability are required which could not have been developed by a conventional multifilament or a conventional braid. The tensile strength is preferably higher, and the upper limit of the tensile strength is not particularly limited, but a multifilament with a tensile strength of, for example, more than 85 cN/dtex is difficult to be produced technically and industrially. A measurement method for tensile strength will be described below.

A difference between the tensile strength of the above-mentioned braid and the tensile strength of the multifilament in a state that the braid is unbraided is preferably 5 cN/dtex or less, and more preferably 4 cN/dtex or less.

[Elongation at Break of Highly Functional Multifilament in State that Braid is Unbraided]

The highly functional multifilament in a state that the braid according to the present invention is unbraided has an elongation at break of preferably 3.0%9 or more, more preferably 3.4%9 or more, furthermore preferably 3.7% or more and preferably 7.0% or less, more preferably 6.0% or less, and furthermore preferably 5.0% or less. If the elongation at break is less than 3.0%, the monofilament is easily cut even by slight strain or tends to be fluffed easily during use of a product or being processed into a product and therefore it is not preferable. On the other hand, if the elongation at break exceeds 7.0%, the dimensional stability is deteriorated and therefore it is not preferable. A measurement method for elongation at break will be described below.

[Initial Modulus of Highly Functional Multifilament in State that Braid is Unbraided]

The highly functional multifilament in a state that the braid according to the present invention is unbraided has an initial modulus of preferably 600 cN/dtex or more and 1500 cN/dtex or less. When the multifilament has the initial modulus as described above, changes in physical properties and shape hardly occur against the external force applied during use of a product or at a step for processing the multifilament into a product. The initial modulus is more preferably 650 cN/dtex or more, furthermore preferably 680 cN/dtex or more, and more preferably 1400 cN/dtex or less, furthermore preferably 1300 cN/dtex or less, and particularly preferably 1200 cN/dtex or less. If the initial modulus exceeds 1500 cN/dtex, the flexibility of the yarn is deteriorated because of the high elastic modulus and therefore it is not preferable. A measurement method for initial modulus will be described below.

[Others]

In order to give other functions, additives such as an antioxidant and a reduction inhibitor as well as a pH adjusting agent, a surface tension reduction agent, a thickener, a moisturizing agent, a color-deepening agent, an antiseptic, an antifungal agent, an antistatic agent, a pigment, mineral fibers, other organic fibers, metal fibers, a sequestrant, and so forth may be added during producing the braid according to the present invention.

The braid according to the present invention can be used for industrial materials such as cut resistant woven and knitted products for protection, tapes, ropes, nets, fishing lines, protection covers for materials, sheets, strings for kites, archery chords, sail cloths, curtain materials, protection materials, bulletproof materials, medical sutures, artificial tendons, artificial muscles, reinforcing materials for fiber-reinforced resins, cement reinforcing materials, reinforcing materials for fiber-reinforced rubber, machine tool components, battery separators and chemical filters.

This application claims the benefit of priority based on Japanese patent application No. 2014-068775 and Japanese patent application No. 2014-068777 filed on Mar. 28, 2014 as well as Japanese patent application No. 2014-118489 and Japanese patent application No. 2014-118491 filed on Jun. 9, 2014. The entire contents of Japanese patent application No. 2014-068775 and Japanese patent application No. 2014-068777 filed on Mar. 28, 2014 as well as Japanese patent application No. 2014-118489 and Japanese patent application No. 2014-118491 filed on Jun. 9, 2014 are incorporated herein by reference.

EXAMPLES

Hereinafter, the present invention will be described more specifically with reference to examples, but the present invention is not limited to the following examples. The present invention can also be carried out by appropriate modifications in a range that can fall within the foregoing and following gists, and all such appropriate modifications are encompassed in the technical scope of the present invention.

The characteristic values of the multifilaments as well as the multifilaments each in a state that the braid is unbraided in the following respective examples and comparative examples were measured as follows. The tensile strength, elongation at break, initial modulus, thermal shrinkage at 120° C., and abrasion test in the case of a load of 5 cN/dtex of the braids in the following respective examples and comparative examples were measured in the same manner as in the case of the multifilaments or the like.

(1) Intrinsic Viscosity

Decalin at a temperature of 135° C. as a solvent was used to obtain various diluted solutions, and specific viscosities of the diluted solutions were measured by Ubbelohde capillary viscometer. An intrinsic viscosity was determined based on extrapolated points to an originating point of a straight line obtained by least squares approximation of the viscosities plotted against concentrations. When the measurement was performed, a sample was divided or cut into portions each having a length of about 5 mm, and 1 mass % of an antioxidant ("YOSHINOX (registered trade name) BHT", manufactured by API Corporation) relative to the sample was added, and stirred and dissolved at 135° C. for 4 hours to prepare measurement solutions.

(2) Weight Average Molecular Weight

A weight average molecular weight was calculated, according to the following equation, from the value of the intrinsic viscosity measured in (1) above.

$$\text{Weight average molecular weight} = 5.365 \times 10^4 \times (\text{intrinsic viscosity})^{1.37}$$

(3) Peak Intensity Ratio in Interior of Monofilament

A crystal size and orientation evaluation were measured by x-ray diffraction method. The World's Largest Synchrotron Radiation Facility SPring-8 was used as an x-ray source, and a BL03 hatch was used. The x-ray used has a wavelength λ of 1.0 Å. A size of the x-ray was adjusted so as to set the distance between the farthest 2 points existing on the outer circumference of the cross section of the x-ray to 7 μm or less. Each sample was set on an XYZ stage such that the monofilament axis was perpendicular to the stage, and the sample was irradiated with the x-ray such that the x-ray was irradiated perpendicularly to the axal direction of the sample. The stage was moved slightly so as to set the middle point of the distance between the farthest 2 points existing on the outer circumference of the cross section of the x-ray to the center of the stage. The x-ray intensity is extremely high, so that if the exposure time of the sample is too long, the sample would be damaged. The exposure time during the x-ray diffraction measurement was therefore set to be within 30 seconds. Under the measurement conditions, x-ray diffraction chart was measured for the respective points by irradiating beam at a substantially even interval from the center part of each monofilament to the outer circumferential periphery of the monofilament. Specifically, x-ray diffraction chart was measured from the center of the diameter of each monofilament to the outer circumferential periphery of the monofilament at 2.5 μm intervals such that the center of the monofilament, points of 2.5 μm, 5.0 μm, 7.5 μm, and so on from the center of the monofilament. For example, in the case of a monofilament with a diameter of 32 μm (radius of 16 μm), the x-ray diffraction chart was measured at 7 points in total: that is, the center, a point of 2.5 μm, a point of 5.0 μm, a point of 7.5 μm, a point of 10.0 μm, a point of 12.5 μm, and a point of 15.0 μm from the center of the monofilament. The x-ray diffraction chart was recorded by using a flat panel installed in a place 67 mm apart from the sample. A peak intensity ratio was calculated from the peak intensity values of the orthorhombic crystal (110) and the orthorhombic crystal (200) in the diffraction profile in the equator direction based on the recorded image data.

(4) Degree of Crystal Orientation in Interior of Monofilament

A measurement was carried out in the same manner as in (3) above using the World's Largest Synchrotron Radiation Facility SPring-8 as an x-ray source. The degree of crystal orientation was calculated, according to the following equation, from the half width of the orientation distribution function of the orthorhombic crystal (110) in the diffraction profile in the azimuth angle direction.

$$\text{Degree of crystal orientation} = (180 - (\text{half width of orthorhombic crystal (110) plane}))/180$$

Specifically, for the degree of crystal orientation, a measurement was carried out from the center of the diameter of each monofilament to the outer circumferential periphery of the monofilament at 2.5 μm intervals such that the center of the monofilament, points of 2.5 μm, 5.0 μm, 7.5 μm, and so on from the center of the monofilament. For example, in the case of a monofilament with a diameter of 32 μm (radius of 16 μm), the measurement was carried out at 7 points in total: that is, the center, a point of 2.5 μm, a point of 5.0 μm, a point of 7.5 μm, a point of 10.0 μm, a point of 12.5 μm, and a point of 15.0 μm from the center of the monofilament.

(5) Tensile Strength, Elongation at Break, and Initial Modulus

Measurements were carried out in accordance with JIS L 1013 8.5.1, and a strain-stress curve was obtained under conditions that a length of a sample was 200 mm (a length between chucks), and an elongation speed was 100 mm/min, an ambient temperature was 20° C., and a relative humidity was 65%, by using a "TENSILON Universal Material Testing Instrument RTF-1310" manufactured by ORIENTEC Co., LTD. A tensile strength and an elongation at break were calculated from a stress and an elongation at breaking point, and an initial modulus was calculated from the tangential line providing a maximum gradient on the curve in the vicinity of the originating point. At this time, an initial load applied to the sample at the measurement was one tenth of the mass (g) per 10000 m of the sample. An average of values obtained in ten measurements was used for each case.

(6) Coefficient of Variation CV'

An initial modulus of each monofilament constituting the sample was measured by the above-mentioned measurement method, and a value of ((standard deviation of initial modulus of monofilament constituting multifilament)/(average value of initial moduli of monofilament constituting multifilament)×100 was calculated and defined as the coefficient of variation CV' (%).

(7) Thermal Shrinkage

Samples were each cut into a size of 70 cm, and positions distant from both ends, respectively, by 10 cm, were marked so as to show that a length of each sample was 50 cm. Next, the samples were hung on a zig so as to prevent a load from being applied thereto, and the samples in this hanging state were heated at a temperature of 70° C. in a hot air circulating type heating furnace for 30 minutes. Thereafter, the samples were taken out of the heating furnace, and gradually cooled down sufficiently to room temperature. Thereafter, a length between the positions which had been marked on each sample at the beginning, was measured. The thermal shrinking percentage can be obtained by using the following equation. The average value of measurement values in two times of the thermal shrinkage was employed.

Thermal shrinkage percentage (%)=100×(length of sample before heating−length of sample after heating)/(length of sample before heating)

Further, the thermal shrinkage at 120° C. was also measured in the same manner as described above except that the temperature of heating for 30 minutes was changed from 70° C. to 120° C.

(8) Thermal Stress

A thermal stress stain measurement apparatus ("TMA/SS120C" manufactured by Seiko Instruments Inc.) was used for the measurement. Each sample was prepared so as to have a length of 20 mm, an initial load of 0.01764 cN/dtex was applied to the sample, and a temperature was increased from room temperature (20° C.) to the melting point at a temperature rising speed of 20° C./minute to measure thermal stress at 120° C. The thermal stress at which the thermal shrinkage became the maximum and the temperature at that time were measured.

(9) Titer

Each sample was cut at 5 points of different positions to give monofilaments each having a length of 20 cm, and the weights thereof were measured, and an average value of the weights was converted into a value for 10000 m to obtain titer (dtex).

(10) Abrasion Test

The abrasion resistance was evaluated by an abrasion test in accordance with the B-method for measuring abrasion strength among general spun yarn testing methods (JIS L 1095). The measurement was carried out using a yarn holding tester, manufactured by ASANO MACHINE MFG CO., LTD. Using hard steel with 2.0 mmφ as a friction block, the test was carried out at a load of 5 cN/dtex or 10 cN/dtex, an ambient temperature of 20° C., a friction speed of 115 times/minute, a reciprocating distance of 2.5 cm, and a friction angle of 110° to measure the number of friction times until the sample was broken. The number of reciprocating friction times at break of each sample by abrasion was measured respectively when the load was set to 5 cN/dtex and when the load was set to 10 cN/dtex. The number of testing times was 7, and the data of the maximum number of times and of the minimum number of times was removed, and the average value of the remaining 5 measurement values was employed. The abrasion test of each multifilament was carried out by using a sample adjusted to have a titer of about 220 dtex.

Example 1-1

A dispersion containing ultra high molecular weight polyethylene having an intrinsic viscosity of 18.0 dL/g, a weight average molecular weight of 2900000 and a melting peak of 134° C. and decalin was adjusted so as to have a polyethylene concentration of 11.0 mass %. This dispersion was converted into a solution by adjusting a retention time in a temperature range of 205° C. to 8 minutes by an extruder, and the polyethylene solution was discharged out of a spinneret at a throughput discharge amount of 4.5 g/minute and a spinneret surface temperature of 180° C. The number of orifices formed in the spinneret was 15, and the orifice diameter was φ1.0 mm. The fine pores for discharging yarns (one end part of the orifice) formed in the surface of the spinneret were shielded so as to be kept from direct contact with the outside air. Specifically, the spinneret was shielded from the outside air by a shielding plate made of 10 mm-thick heat insulating glass. The distance between the shielding plate and the fine pore nearest to the shielding plate was set to 40 mm, and the distance between the shielding plate and the fine pore farthest from the shielding plate was set to 60 mm. A difference between the highest temperature in the fine pore and the lowest temperature in the fine pore was 3° C., and the coefficient of variation CV" of the discharge amount in each fine pore ((standard deviation of discharge amount of 15 fine pores)/(average value of discharge amount of 15 fine pores)×100) was 8%. The discharge yarn thread was cooled in a water-cooling bath at 20° C., while being taken, and thereafter the yarn thread was taken at a speed of 70 m/minute to obtain an undrawn multifilament comprising 15 monofilaments. Next, the above-mentioned undrawn multifilament was drawn 4.0 times while being heated and dried by hot air at 120° C. Successively, the multifilament was drawn 2.7 times by hot air at 150° C., and in the drawn state, the drawn multifilament was immediately wound up. The total draw ratio was set to 10.8 times, the total drawing time was set to 4 minutes, and the deformation rate during the drawing was set to 0.0300 sec$^{-1}$. The temperature during winding up of the drawn multifilament was set to 30° C., and the tension during winding up was set to 0.100 cN/dtex. The retention time between after drawing process at 150° C. and before winding process was 2 minutes. The multifilament production conditions are shown in Table 1, and the physical properties and evaluation results of the obtained multifilament are shown in Table 2.

Example 1-2

A multifilament was obtained in the same manner as in Example 1-1, except that the throughput discharge amount of the polyethylene solution was set to 5.0 g/minute; the distance between the shielding plate and the fine pore farthest from the shielding plate was set to 80 mm; the difference between the highest temperature in the fine pore and the lowest temperature in the fine pore was set to 4° C.; the coefficient of variation CV" of the discharge amount in each fine pore was set to 11%; the spinning speed was set to 60 m/minute; the draw ratio by hot air at 150° C. was set to 2.5 times (total draw ratio to 10.0 times); the total drawing time was set to 6 minutes; and the deformation rate during the drawing was set to 0.0200 sec*$^{1}$ in Example 1-1. The multifilament production conditions are shown in Table 1, and the physical properties and evaluation results of the obtained multifilament are shown in Table 2.

Example 1-3

A multifilament was obtained in the same manner as in Example 1-1, except that the distance between the shielding plate and the fine pore farthest from the shielding plate was set to 45 mm; the difference between the highest temperature in the fine pore and the lowest temperature in the fine pore was set to 2° C.; the coefficient of variation CV" of the discharge amount in each fine pore was set to 6%; the total drawing time was set to 12 minutes; the deformation rate during the drawing was set to 0.0100 sec$^{-1}$; the tension during winding up was set to 0.200 cN/dtex; and the retention time between after drawing process and before winding process was set to 1 minute in Example 1-1. The multifilament production conditions are shown in Table 1, and the physical properties and evaluation results of the obtained multifilament are shown in Table 2.

Example 1-4

A multifilament was obtained in the same manner as in Example 1-1, except that the retention time in the temperature range of 205° C. was set to 11 minutes; the draw ratio by hot air at 150° C. was set to 2.5 times (total draw ratio was set to 10.0 times); the total drawing time was set to 5 minutes; the deformation rate during the drawing was set to 0.0240 sec$^{-1}$; the temperature during winding up of the drawn yarn was set to 40° C.; the tension during winding up was set to 0.030 cN/dtex; and the retention time between after drawing process and before winding process was set to 5 minutes in Example 1-1. The multifilament production conditions are shown in Table 1, and the physical properties and evaluation results of the obtained multifilament are shown in Table 2.

Example 1-5

A multifilament was obtained in the same manner as in Example 1-1, except that the retention time in the temperature range of 205° C. was set to 18 minutes; the draw ratio by hot air at 120° C. was set to 4.5 times; the draw ratio by hot air at 150° C. was set to 2.2 times (total draw ratio was set to 9.9 times); the total drawing time was set to 5 minutes; and the deformation rate during the drawing was set to 0.0240 sec$^{-1}$ in Example 1-1. The multifilament production conditions are shown in Table 1, and the physical properties and evaluation results of the obtained multifilament are shown in Table 2.

Comparative Example 1-1

A multifilament was obtained in the same manner as in Example 1-1, except that the retention time in the temperature range of 205° C. was set to 32 minutes; the throughput discharge amount was set to 1.0 g/minute; the shielding plate made of 10 mm-thick insulating glass was not installed; the difference between the highest temperature in the fine pore and the lowest temperature in the fine pore was set to 12° C.; the coefficient of variation CV" of the discharge amount in each fine pore was set to 23%; the draw ratio by hot air at 120° C. was set to 3.0 times; and the draw ratio by hot air at 150° C. was set to 2.3 times (total draw ratio was set to 6.9 times) in Example 1-1. The multifilament production conditions are shown in Table 1 and the physical properties and evaluation results of the obtained multifilament are shown in Table 2.

Comparative Example 1-2

A multifilament was obtained in the same manner as in Example 1-1, except that the discharged yarn thread was cooled in a cooling water bath at 65° C. and the undrawn yarn was obtained under the condition of spinning speed of 10 m/minute in Example 1-1. The multifilament production conditions are shown in Table 1 and the physical properties and evaluation results of the obtained multifilament are shown in Table 2.

Comparative Example 1-3

A multifilament was obtained in the same manner as in Example 1-1, except that the total drawing time was set to 25 minutes and the deformation rate during drawing was set to 0.0005 sec$^{-1}$ in Example 1-1. The multifilament production conditions are shown in Table 1 and the physical properties and evaluation results of the obtained multifilament are shown in Table 2.

Comparative Example 1-4

A multifilament was obtained in the same manner as in Example 1-1, except that the draw ratio by hot air at 120° C. was set to 3.5 times; the draw ratio by hot air at 150° C. was set to 2.0 times (total draw ratio was set to 7.0 times); the temperature during winding up of the drawn yarn was set to 70° C.; and the tension during winding up was set to 0.008 cN/dtex in Example 1-1. The multifilament production conditions are shown in Table 1 and the physical properties and evaluation results of the obtained multifilament are shown in Table 2.

Comparative Example 1-5

In the same manner as in the production method described in Japanese Patent No. 4141686 (Patent Document 3), a slurry-like mixture containing 10 mass % ultra high molecular weight polyethylene having an intrinsic viscosity of 21.0 dL/g, a weight average molecular weight of 3500000 and a melting peak of 135° C. and 90 mass % decalin was supplied to a screw-type kneader. This was converted into a solution by adjusting a retention time in a temperature range of 230° C. to 11 minutes, and the polyethylene solution was discharged out of a spinneret at a throughput discharge amount of 1.4 g/minute and a spinneret surface temperature of 170° C. The number of orifices formed in the spinneret was 96, and the orifice diameter was φ0.7 mm. A difference between the highest temperature in the fine pore and the lowest temperature in the fine pore was 12° C., and the coefficient of variation CV" of the discharge amount in each fine pore ((standard deviation of discharge amount of 96 fine pores)/ (average value of discharge amount of 96 fine pores)×100) was 24%. Nitrogen gas at 100° C. was blown as evenly as possible at an average wind velocity of 1.2 m/second to the discharged yarn thread from slit-like orifices for gas supply disposed immediately under a spinneret to positively evaporate decalin from the fiber surface. Immediately thereafter, the discharged yarn thread was cooled with an air current set at 30° C. while being taken. Thereafter, the resulting yarn thread was taken at a speed of 75 m/minute by a Nelson-like roller installed downstream of the spinneret to obtain an undrawn multifilament comprising 96 monofilaments. At this time, the weight of the solvent contained in the yarn thread was decreased to be about half of the weight of the solvent contained in the yarn thread at the time of being discharged out of the spinneret. Next, the above-mentioned undrawn multifilament was drawn 4.0 times while being heated and dried by hot air at 100° C. in a heating oven. Successively; the multifilament was drawn 4.0 times by hot air at 149° C. in the heating oven, and in the drawn state, the drawn multifilament was immediately wound up. The total draw ratio was set to 16.0 times, the total drawing time was set to 8 minutes, and the deformation rate during the drawing was set to 0.0200 sec$^{-1}$. The temperature during winding up of the drawn multifilament was set to 30° C. and the tension during winding up was set to 0.100 cN/dtex. The retention time between after drawing process at 149° C. and before winding process was 2 minutes. The multifilament production conditions are shown in Table 1 and the physical properties and evaluation results of the obtained multifilament are shown in Table 2.

Comparative Example 1-6

A dispersion containing ultra high molecular weight polyethylene having an intrinsic viscosity of 11.0 dL/g, a weight average molecular weight of 1400000, and a melting peak of 131° C. and liquid paraffin was adjusted so as to have a polyethylene concentration of 14.0 mass %. This dispersion was converted into a solution by adjusting a retention time in a temperature range of 220° C. to 39 minutes by an extruder, and the polyethylene solution was discharged out of a spinneret at a throughput discharge amount of 2.0 g/minute and a spinneret surface temperature of 170° C. The number of orifices formed in the spinneret was 48, and the orifice diameter was φ1.0 mm. A difference between the highest temperature in the fine pore and the lowest temperature in the fine pore was 13° C., and the coefficient of variation CV" of the discharge amount in each fine pore ((standard deviation of discharge amount of 48 fine pores)/ (average value of discharge amount of 48 fine pores)×100) was 22%. The discharge yarn thread was cooled in a water-cooling bath at 20° C., while being taken, and thereafter the yarn thread was taken at a speed of 35 m/minute to obtain an undrawn multifilament comprising 48 monofilaments. Next, the above-mentioned undrawn multifilament was allowed to pass through n-decane at 80° C. to remove the liquid paraffin. Next, the above-mentioned undrawn multifilament was drawn 6.0 times while being heated and dried by hot air at 120° C. Successively, the multifilament was drawn 3.0 times by hot air at 150° C., and in the drawn state, the drawn multifilament was immediately wound up. The total draw ratio was set to 18.0 times, the total drawing time was set to 9 minutes, and the deformation rate during the drawing was set to 0.0400 sec$^{-1}$. The temperature during winding up of the drawn multifilament was set to 30° C., and the tension during winding up was set to 0.100 cN/dtex. The retention time between after drawing process at 150° C. and before winding process was 2 minutes. The multifilament production conditions are shown in Table 1 and the physical properties and evaluation results of the obtained multifilament are shown in Table 2.

Comparative Example 1-7

A multifilament was obtained in the same manner as in Example 1-1, except that the retention time in the temperature range of 205° C. was set to 25 minutes; the throughput discharge amount was set to 1.3 g/minute: the shielding plate made of 10 mm-thick insulating glass was not installed; the difference between the highest temperature in the fine pore and the lowest temperature in the fine pore was set to 10° C.; the coefficient of variation CV" of the discharge amount in each fine pore was set to 14%; the draw ratio by hot air at 120° C. was set to 3.0 times; and the draw ratio by hot air at 150° C. was set to 2.3 times (total draw ratio was set to 6.9 times) in Example 1-1. The multifilament production conditions are shown in Table 1 and the physical properties and evaluation results of the obtained multifilament are shown in Table 2.

TABLE 1

| | | | unit | Example 1-1 | Example 1-2 | Example 1-3 | Example 1-4 |
|---|---|---|---|---|---|---|---|
| Production method | Raw material | Intrinsic viscosity | [dL/g] | 18.0 | 18.0 | 18.0 | 18.0 |
| | | Weight average molecular weight | [g/mol] | 2,900,000 | 2,900,000 | 2,900,000 | 2,900,000 |
| | Dissolution step | Kind of solvent | — | decalin | decalin | decalin | decalin |
| | | Concentration of the polyethylene | [mass %] | 11.0 | 11.0 | 11.0 | 11.0 |
| | | Retention time during temperature range of more than 200° C. by an extruder | [min] | 8 | 8 | 8 | 11 |
| | Spinning step | Spinneret temperature | [° C.] | 180 | 180 | 180 | 180 |
| | | Throughput at an orifice | [g/min] | 4.5 | 5.0 | 4.5 | 4.5 |
| | | Maximum value of temperature difference among the fine pores | [° C.] | 3 | 4 | 2 | 3 |
| | | Coefficient of variation of the discharge amount in each fine pore | [%] | 8 | 11 | 6 | 8 |
| | | Number of pores | [piece] | 15 | 15 | 15 | 15 |
| | | Orifice diameter | [mm] | 1.0 | 1.0 | 1.0 | 1.0 |
| | | Quenching temperature | [° C.] | 20 | 20 | 20 | 20 |
| | | Spinning speed | [m/min] | 70 | 60 | 70 | 70 |
| | Drawing step | Number of drawing step | [times] | 2 | 2 | 2 | 2 |
| | | Draw ratio | [times] | 10.8 | 10.0 | 10.8 | 10.0 |
| | | Drawing time | [min] | 4.0 | 6.0 | 12.0 | 5.0 |
| | | Deformation rate during drawing | [sec$^{-1}$] | 0.0300 | 0.0200 | 0.0100 | 0.0240 |
| | Winding step | Retention time between after drawing process and before winding process | [min] | 2 | 2 | 1 | 6 |
| | | Temperature during winding up | [° C.] | 30 | 30 | 30 | 40 |
| | | Tension during winding up | [cN/dtex] | 0.100 | 0.100 | 0.200 | 0.030 |

TABLE 1-continued

|  |  |  | unit | Example 1-5 | Comparative Example 1-1 | Comparative Example 1-2 | Comparative Example 1-3 |
|---|---|---|---|---|---|---|---|
| Production method | Raw material | Intrinsic viscosity | [dL/g] | 18.0 | 18.0 | 18.0 | 18.0 |
|  |  | Weight average molecular weight | [g/mol] | 2,900,000 | 2,900,000 | 2,900,000 | 2,900,000 |
|  | Dissolution step | Kind of solvent | — | decalin | decalin | decalin | decalin |
|  |  | Concentration of the polyethylene | [mass %] | 11.0 | 11.0 | 11.0 | 11.0 |
|  |  | Retention time during temperature range of more than 200° C. by an extruder | [min] | 18 | 32 | 8 | 8 |
|  | Spinning step | Spinneret temperature | [° C.] | 180 | 180 | 180 | 180 |
|  |  | Throughput at an orifice | [g/min] | 4.5 | 1.0 | 4.5 | 4.5 |
|  |  | Maximum value of temperature difference among the fine pores | [° C.] | 3 | 12 | 3 | 3 |
|  |  | Coefficient of variation of the discharge amount in each fine pore | [%] | 8 | 23 | 8 | 8 |
|  |  | Number of pores | [piece] | 15 | 15 | 15 | 15 |
|  |  | Orifice diameter | [mm] | 1.0 | 1.0 | 1.0 | 1.0 |
|  |  | Quenching temperature | [° C.] | 20 | 20 | 65 | 20 |
|  |  | Spinning speed | [m/min] | 70 | 70 | 10 | 70 |
|  | Drawing step | Number of drawing step | [times] | 2 | 2 | 2 | 2 |
|  |  | Draw ratio | [times] | 9.9 | 6.9 | 10.8 | 10.8 |
|  |  | Drawing time | [min] | 5.0 | 4.0 | 4.0 | 25.0 |
|  |  | Deformation rate during drawing | [sec$^{-1}$] | 0.0240 | 0.0300 | 0.0300 | 0.0005 |
|  | Winding step | Retention time between after drawing process and before winding process | [min] | 2 | 2 | 2 | 2 |
|  |  | Temperature during winding up | [° C.] | 30 | 30 | 30 | 30 |
|  |  | Tension during winding up | [cN/dtex] | 0.100 | 0.100 | 0.100 | 0.100 |

|  |  |  | unit | Comparative Example 1-4 | Comparative Example 1-5 | Comparative Example 1-6 | Comparative Example 1-7 |
|---|---|---|---|---|---|---|---|
| Production method | Raw material | Intrinsic viscosity | [dL/g] | 18.0 | 21.0 | 11.0 | 18.0 |
|  |  | Weight average molecular weight | [g/mol] | 2,900,000 | 3,500,000 | 1,400,000 | 2,900,000 |
|  | Dissolution step | Kind of solvent | — | decalin | decalin | liquid paraffin | decalin |
|  |  | Concentration of the polyethylene | [mass %] | 11.0 | 10.0 | 14.0 | 11.0 |
|  |  | Retention time during temperature range of more than 200° C. by an extruder | [min] | 8 | 11 | 39 | 25 |
|  | Spinning step | Spinneret temperature | [° C.] | 180 | 170 | 170 | 180 |
|  |  | Throughput at an orifice | [g/min] | 4.5 | 1.4 | 2.0 | 1.3 |
|  |  | Maximum value of temperature difference among the fine pores | [° C.] | 3 | 12 | 13 | 10 |
|  |  | Coefficient of variation of the discharge amount in each fine pore | [%] | 8 | 24 | 22 | 14 |
|  |  | Number of pores | [piece] | 15 | 96 | 48 | 15 |
|  |  | Orifice diameter | [mm] | 1.0 | 0.7 | 1.0 | 1.0 |
|  |  | Quenching temperature | [° C.] | 20 | 30 | 20 | 20 |
|  |  | Spinning speed | [m/min] | 70 | 73 | 35 | 70 |
|  | Drawing step | Number of drawing step | [times] | 2 | 2 | 2 | 2 |
|  |  | Draw ratio | [times] | 7.0 | 16.0 | 18.0 | 6.9 |
|  |  | Drawing time | [min] | 4.0 | 8.0 | 9.0 | 4.0 |
|  |  | Deformation rate during drawing | [sec$^{-1}$] | 0.0300 | 0.0200 | 0.0400 | 0.0300 |
|  | Winding step | Retention time between after drawing process and before winding process | [min] | 2 | 2 | 2 | 2 |
|  |  | Temperature during winding up | [° C.] | 70 | 30 | 30 | 30 |
|  |  | Tension during winding up | [cN/dtex] | 0.008 | 0.100 | 0.100 | 0.100 |

TABLE 2

|  |  | unit | Example 1-1 | Example 1-2 | Example 1-3 | Example 1-4 | Example 1-5 |
|---|---|---|---|---|---|---|---|
| Structure | Maximum value of the peak intensity ratio | [—] | 0.33 | 0.31 | 0.38 | 0.32 | 0.30 |
|  | Minimum value of the peak intensity ratio | [—] | 0.25 | 0.21 | 0.31 | 0.18 | 0.15 |
|  | Difference between the maximum value of the peak intensity ratio and the minimum value of the peak intensity radio | [—] | 0.08 | 0.10 | 0.07 | 0.14 | 0.15 |
|  | Coefficient of variation of the peak intensity ratio | [%] | 5 | 16 | 4 | 23 | 28 |
|  | Maximum value of the degree of crystal orientation | [—] | 0.986 | 0.978 | 0.993 | 0.980 | 0.978 |
|  | Minimum value of the degree of crystal orientation | [—] | 0.980 | 0.973 | 0.988 | 0.975 | 0.972 |
|  | Difference between the maximum value of the degree of crystal orientation and the minimum value of the degree of crystal orientation | [—] | 0.006 | 0.005 | 0.005 | 0.005 | 0.006 |

TABLE 2-continued

| Physical properties | | unit | | | | | |
|---|---|---|---|---|---|---|---|
| | Titer of monofilaments | [dtex] | 6.5 | 9.2 | 6.5 | 7.1 | 7.1 |
| | Diameter of monofilaments | [μm] | 31.7 | 37.5 | 31.7 | 33.0 | 33.0 |
| | Number of monofilament | [number] | 15 | 15 | 15 | 15 | 15 |
| | Tensile strength | [cN/dtex] | 25 | 22 | 26 | 21 | 21 |
| | Elongation at break | [%] | 4.1 | 4.3 | 4.1 | 4.2 | 4.3 |
| | Initial modulus | [cN/dtex] | 590 | 680 | 920 | 710 | 680 |
| | Coefficient of variation of elastic modulus of the multifilament | [%] | 14 | 12 | 6 | 15 | 16 |
| | Maximum thermal stress | [cN/dtex] | 0.43 | 0.31 | 0.46 | 0.38 | 0.30 |
| | Temperature at maximum thermal stress | [° C.] | 141 | 138 | 140 | 141 | 141 |
| | Thermal stress at 120° C. | [cN/dtex] | 0.23 | 0.17 | 0.23 | 0.19 | 0.17 |
| | Thermal shrinkage at 70° C. | [%] | 0.08 | 0.11 | 0.10 | 0.14 | 0.14 |
| | Thermal shrinkage at 120° C. | [%] | 1.9 | 2.2 | 2.0 | 2.6 | 2.6 |
| | Number of reciprocating abrasions at break at a load of 5 cN/dtex | [times] | 3052 | 4068 | 3260 | 2841 | 2713 |
| | Number of reciprocating abrasions at break at a load of 10 cN/dtex | [times] | 288 | 346 | 309 | 211 | 193 |

| | | unit | Comparative Example 1-1 | Comparative Example 1-2 | Comparative Example 1-3 | Comparative Example 1-4 |
|---|---|---|---|---|---|---|
| Structure | Maximum value of the peak intensity ratio | [—] | 0.31 | 0.43 | 0.36 | 0.30 |
| | Minimum value of the peak intensity ratio | [—] | 0.07 | 0.03 | 0.04 | 0.07 |
| | Difference between the maximum value of the peak intensity ratio and the minimum value of the peak intensity radio | [—] | 0.24 | 0.40 | 0.32 | 0.23 |
| | Coefficient of variation of the peak intensity ratio | [%] | 51 | 64 | 61 | 52 |
| | Maximum value of the degree of crystal orientation | [—] | 0.969 | 0.954 | 0.959 | 0.965 |
| | Minimum value of the degree of crystal orientation | [—] | 0.954 | 0.942 | 0.944 | 0.953 |
| | Difference between the maximum value of the degree of crystal orientation and the minimum value of the degree of crystal orientation | [—] | 0.015 | 0.012 | 0.015 | 0.012 |
| Physical properties | Titer of monofilaments | [dtex] | 2.5 | 45.8 | 6.5 | 10.1 |
| | Diameter of monofilaments | [μm] | 26.0 | 33.9 | 31.7 | 39.4 |
| | Number of monofilament | [number] | 15 | 15 | 15 | 15 |
| | Tensile strength | [cN/dtex] | 17 | 8 | 12 | 17 |
| | Elongation at break | [%] | 4.3 | 6.5 | 6.1 | 5.1 |
| | Initial modulus | [cN/dtex] | 530 | 211 | 440 | 490 |
| | Coefficient of variation of elastic modulus of the multifilament | [%] | 38 | 16 | 28 | 33 |
| | Maximum thermal stress | [cN/dtex] | 0.18 | 0.13 | 0.16 | 0.17 |
| | Temperature at maximum thermal stress | [° C.] | 140 | 139 | 139 | 141 |
| | Thermal stress at 120° C. | [cN/dtex] | 0.13 | 0.10 | 0.14 | 0.14 |
| | Thermal shrinkage at 70° C. | [%] | 0.08 | 0.23 | 0.22 | 0.21 |
| | Thermal shrinkage at 120° C. | [%] | 1.9 | 3.3 | 3.1 | 3.1 |
| | Number of reciprocating abrasions at break at a load of 5 cN/dtex | [times] | 920 | 125 | 201 | 896 |
| | Number of reciprocating abrasions at break at a load of 10 cN/dtex | [times] | 58 | breakage just after measurement | 11 | 89 |

| | | | unit | Comparative Example 1-5 | Comparative Example 1-6 | Comparative Example 1-7 |
|---|---|---|---|---|---|---|
| | Structure | Maximum value of the peak intensity ratio | [—] | 0.35 | 0.51 | 3.1 |
| | | Minimum value of the peak intensity ratio | [—] | 0.12 | 0.20 | 28.0 |
| | | Difference between the maximum value of the peak intensity ratio and the minimum value of the peak intensity radio | [—] | 0.23 | 0.31 | 15 |
| | | Coefficient of variation of the peak intensity ratio | [%] | 51 | 58 | 18 |
| | | Maximum value of the degree of crystal orientation | [—] | 0.981 | 0.969 | 4.4 |
| | | Minimum value of the degree of crystal orientation | [—] | 0.936 | 0.950 | 510 |
| | | Difference between the maximum value of the degree of crystal orientation and the minimum value of the degree of crystal orientation | [—] | 0.045 | 0.019 | 31 |
| | Physical properties | Titer of monofilaments | [dtex] | 1.2 | 4.9 | 0.17 |
| | | Diameter of monofilaments | [μm] | 12.3 | 28.0 | 140 |
| | | Number of monofilament | [number] | 96 | 48 | 0.12 |
| | | Tensile strength | [cN/dtex] | 38 | 25 | 0.09 |
| | | Elongation at break | [%] | 3.9 | 3.3 | 2.0 |
| | | Initial modulus | [cN/dtex] | 1521 | 780 | 895 |
| | | Coefficient of variation of elastic modulus of the multifilament | [%] | 31 | 39 | 52 |
| | | Maximum thermal stress | [cN/dtex] | 40.00 | 0.34 | 0.32 |
| | | Temperature at maximum thermal stress | [° C.] | 130 | 140 | 0.08 |
| | | Thermal stress at 120° C. | [cN/dtex] | 0.13 | 0.14 | 0.24 |
| | | Thermal shrinkage at 70° C. | [%] | 0.23 | 0.23 | 50 |
| | | Thermal shrinkage at 120° C. | [%] | 3.1 | 3.4 | 0.959 |

TABLE 2-continued

| | | | | |
|---|---|---|---|---|
| Number of reciprocating abrasions at break at a load of 5 cN/dtex | [times] | 320 | 913 | 0.941 |
| Number of reciprocating abrasions at break at a load of 10 cN/dtex | [times] | 29 | 88 | 0.018 |

Example 2-1

A braid was produced by braiding 4 multifilaments of Example 1-1 such that a braiding angle was adjusted to 20°. The braid was subjected to heat treatment by heating in a hot air heating furnace set at 151° C. A time for the heat treatment was set to 1.5 minutes, a tension applied to the braid during the heat treatment was set to 1.6 cN/dtex, and a re-draw ratio was set to 2.00 times. The braid production conditions, the physical properties and evaluation results of the braid obtained, and the physical properties of the multifilament in a state that the braid is unbraided are shown in Table 3.

Example 2-2

A multifilament was obtained in the same manner as in Example 2-1, except that the tension during the heat treatment was set to 2.4 cN/dtex and the re-draw ratio was set to 3.00 times in Example 2-1. The braid production conditions, the physical properties and evaluation results of the braid obtained, and the physical properties of the multifilament in a state that the braid is unbraided are shown in Table 3.

Example 2-3

A multifilament was obtained in the same manner as in Example 2-1, except that the heat treatment temperature was set to 152° C., the heat treatment time was set to 2.0 minutes, the tension during the heat treatment was set to 3.8 cN/dtex, and the re-draw ratio was set to 4.00 times in Example 2-1. The braid production conditions, the physical properties and evaluation results of the braid obtained, and the physical properties of the multifilament in a state that the braid is unbraided are shown in Table 3.

Example 2-4

A braid was produced by braiding 4 multifilaments of Example 1-2 such that a braiding angle was adjusted to 20°. The braid was subjected to heat treatment by heating in a hot air heating furnace set at 151° C. A time for the heat treatment was set to 1.0 minute, a tension applied to the braid during the heat treatment was set to 1.4 cN/dtex, and a re-draw ratio was set to 1.80 times. The braid production conditions, the physical properties and evaluation results of the braid obtained, and the physical properties of the multifilament in a state that the braid is unbraided are shown in Table 3.

Example 2-5

A multifilament was obtained in the same manner as in Example 2-4, except that the heat treatment time was set to 2.0 minutes, the tension during the heat treatment was set to 2.7 cN/dtex, and the re-draw ratio was set to 3.50 times in Example 2-4. The braid production conditions, the physical properties and evaluation results of the braid obtained, and the physical properties of the multifilament in a state that the braid is unbraided are shown in Table 3.

Comparative Example 2-1

A braid was produced by braiding 4 multifilaments of Comparative Example 1-1 such that a braiding angle was adjusted to 20°. The braid was subjected to heat treatment by heating in a hot air heating furnace set at 142° C. A time for the heat treatment was set to 0.08 minutes, a tension applied to the braid during the heat treatment was set to 4.3 cN/dtex, and a re-draw ratio was set to 1.04 times. The braid production conditions, the physical properties and evaluation results of the braid obtained, and the physical properties of the multifilament in a state that the braid is unbraided are shown in Table 3.

Comparative Example 2-2

A multifilament was obtained in the same manner as in Example 2-1, except that the heat treatment temperature was set to 135° C., the heat treatment time was set to 35 minutes, the tension during the heat treatment was set to 0.005 cN/dtex, and the re-draw ratio was set to 1.01 times in Comparative Example 2-1. The braid production conditions, the physical properties and evaluation results of the braid obtained, and the physical properties of the multifilament in a state that the braid is unbraided are shown in Table 3.

Comparative Example 2-3

A multifilament was obtained in the same manner as in Example 2-1, except that the heat treatment temperature was set to 145° C., the heat treatment time was set to 35 minutes, the tension during the heat treatment was set to 0.01 cN/dtex, and the re-draw ratio was set to 1.02 times in Example 2-1. The braid production conditions, the physical properties and evaluation results of the braid obtained, and the physical properties of the multifilament in a state that the braid is unbraided are shown in Table 3.

Comparative Example 2-4

A braid was produced by braiding 4 multifilaments of Example 1-1 such that a braiding angle was adjusted to 20°. The braid was heated in a hot air heating furnace set at 65° C. and subjected to heat treatment so as to have a re-draw ratio of 1.50 times; however, the multifilament was cut in the middle of the re-drawing, and thus no braid could be obtained.

Comparative Example 2-5

A braid was produced by braiding 4 multifilaments of Comparative Example 1-5 such that a braiding angle was adjusted to 20°. The braid was subjected to heat treatment by heating in a hot air heating furnace set at 139° C. A time for the heat treatment was set to 35 minutes, a tension applied to the braid during the heat treatment was set to 0.05 cN/dtex, and a re-draw ratio was set to 1.05 times. The braid production conditions, the physical properties and evaluation results of the braid obtained, and the physical properties of the multifilament in a state that the braid is unbraided are shown in Table 3.

Comparative Example 2-6

A braid was produced by braiding 4 multifilaments of Comparative Example 1-6 such that a braiding angle was adjusted to 20°. The braid was subjected to heat treatment by heating in a hot air heating furnace set at 139° C. A time for the heat treatment was set to 35 minutes, a tension applied to the braid during the heat treatment was set to 0.03 cN/dtex, and a re-draw ratio was set to 1.05 times. The braid production conditions, the physical properties and evaluation results of the obtained braid, and the physical properties of the multifilament in a state that the braid is unbraided are shown in Table 3.

TABLE 3

| | | | braid | | | | |
|---|---|---|---|---|---|---|---|
| | | | Example 2-1 | Example 2-2 | Example 2-3 | Example 2-4 | Example 2-5 |
| | multifilament used | | Example 1-1 | Example 1-1 | Example 1-1 | Example 1-2 | Example 1-2 |
| Production method for the braid | Heat treatment temperature | [° C.] | 151 | 151 | 152 | 151 | 151 |
| | Heat treatment time | [—] | 1.5 min | 1.5 min | 2.0 min | 1.0 min | 2.0 min |
| | Tension during the heat treatment | [cN/dtex] | 1.6 | 2.4 | 3.8 | 1.4 | 2.7 |
| | Draw ratio during heat treatment | [—] | 2.00 | 3.00 | 4.00 | 1.80 | 3.80 |
| Physical properties of the braid | Tensile strength (A) | [cN/dtex] | 23 | 26 | 29 | 19 | 24 |
| | Elongation at break | [%] | 4.0 | 3.4 | 3.1 | 4.4 | 3.7 |
| | Initial modulus | [cN/dtex] | 772 | 941 | 1023 | 406 | 863 |
| | Number of yarn constituting the braid | [number] | 4 | 4 | 4 | 4 | 4 |
| | Thermal shrinkage at 120° C. | [%] | 1.1 | 0.8 | 0.6 | 1.7 | 1.4 |
| | Number of reciprocating abrasions at break at a load of 5 cN/dtex (B) | [times] | 2567 | 2364 | 1816 | 3746 | 3290 |
| Structure of multifilament in state that braid is unbraided | Maximum value of the peak intensity ratio | [—] | 0.36 | 0.38 | 0.40 | 0.32 | 0.35 |
| | Minimum value of the peak intensity ratio | [—] | 0.27 | 0.28 | 0.31 | 0.21 | 0.24 |
| | Difference of the maximum value of the peak intensity ratio and the minimum value of the peak intensity | [—] | 0.09 | 0.10 | 0.09 | 0.10 | 0.11 |
| | Coefficient of variation of the peak intensity | [%] | 11 | 12 | 11 | 14 | 15 |
| | Maximum value of the degree of crystal orientation | [—] | 0.989 | 0.994 | 0.995 | 0.980 | 0.982 |
| | Minimum value of the degree of crystal orientation | [—] | 0.983 | 0.989 | 0.990 | 0.975 | 0.976 |
| | Difference between the maximum value of the degree of crystal orientation and the minimum value of the degree of crystal orientation | [—] | 0.006 | 0.005 | 0.005 | 0.005 | 0.006 |
| Physical properties of multifilament in state that braid is unbraided | Titer of monofilament in multifilament | [dtex] | 4.1 | 3.3 | 2.4 | 6.3 | 3.5 |
| | Tensile strength (C) | [cN/dtex] | 25 | 28 | 33 | 20 | 27 |
| | Difference between tensile strength (A) and tensile strength (C) | [cN/dtex] | 2 | 2 | 4 | 1 | 3 |
| | Diameter of monofilament | [μm] | 25 | 22 | 19 | 31 | 23 |
| | Elongation at break | [%] | 4.1 | 4.0 | 3.9 | 4.2 | 4.0 |
| | Initial modulus | [cN/dtex] | 900 | 950 | 1020 | 710 | 760 |
| | Thermal stress at 120° C. | [cN/dtex] | 0.17 | 0.21 | 0.24 | 0.16 | 0.22 |
| | Thermal shrinkage at 70° C. | [%] | 0.08 | 0.06 | 0.05 | 0.10 | 0.08 |
| | Thermal shrinkage at 120° C. | [%] | 1.8 | 1.6 | 1.2 | 2.1 | 1.7 |
| | Number of reciprocating abrasions at break at a load of 5 cN/dtex (D) | [times] | 2790 | 2482 | 1920 | 3810 | 3329 |
| | Number of reciprocating abrasions at break at a load of 10 cN/dtex | [times] | 275 | 241 | 199 | 329 | 291 |
| | Difference between (B) and (D) | [times] | 223 | 118 | 104 | 64 | 39 |

| | | | braid | | |
|---|---|---|---|---|---|
| | | | Comparative Example 2-1 | Comparative Example 2-2 | Comparative Example 2-3 |
| | multifilament used | | Comparative Example 1-1 | Comparative Example 1-1 | Example 1-1 |
| Production method for the braid | Heat treatment temperature | [° C.] | 142 | 135 | 145 |
| | Heat treatment time | [—] | 0.08 sec | 35 min | 35 min |
| | Tension during the heat treatment | [cN/dtex] | 4.3 | 0.005 | 0.01 |
| | Draw ratio during heat treatment | [—] | 1.04 | 1.01 | 1.02 |
| Physical properties of the braid | Tensile strength (A) | [cN/dtex] | 14 | 6 | 9 |
| | Elongation at break | [%] | 5.1 | 5.6 | 5.3 |
| | Initial modulus | [cN/dtex] | 305 | 125 | 210 |
| | Number of yarn constituting the braid | [number] | 4 | 4 | 4 |
| | Thermal shrinkage at 120° C. | [%] | 3.6 | 5.1 | 4.9 |
| | Number of reciprocating abrasions at break at a load of 5 cN/dtex (B) | [times] | 426 | 407 | 439 |

TABLE 3-continued

| | | | | | |
|---|---|---|---|---|---|
| Structure of multifilament in state that braid is unbraided | Maximum value of the peak intensity ratio | [—] | 0.31 | 0.29 | 0.30 |
| | Minimum value of the peak intensity ratio | [—] | 0.06 | 0.09 | 0.06 |
| | Difference of the maximum value of the peak intensity ratio and the minimum value of the peak intensity | [—] | 0.25 | 0.20 | 0.24 |
| | Coefficient of variation of the peak intensity | [%] | 62 | 46 | 59 |
| | Maximum value of the degree of crystal orientation | [—] | 0.968 | 0.957 | 0.965 |
| | Minimum value of the degree of crystal orientation | [—] | 0.953 | 0.943 | 0.951 |
| | Difference between the maximum value of the degree of crystal orientation and the minimum value of the degree of crystal orientation | [—] | 0.015 | 0.014 | 0.014 |
| Physical properties of multifilament in state that braid is unbraided | Titer of monofilament in multifilament | [dtex] | 1.6 | 2.5 | 2.5 |
| | Tensile strength (C) | [cN/dtex] | 16 | 17 | 16 |
| | Difference between tensile strength (A) and tensile strength (C) | [cN/dtex] | 2 | 11 | 7 |
| | Diameter of monofilament | [μm] | 16 | 20 | 20 |
| | Elongation at break | [%] | 2.9 | 4.5 | 4.7 |
| | Initial modulus | [cN/dtex] | 550 | 405 | 475 |
| | Thermal stress at 120° C. | [cN/dtex] | 0.14 | 0.04 | 0.06 |
| | Thermal shrinkage at 70° C. | [%] | 0.12 | 0.14 | 0.13 |
| | Thermal shrinkage at 120° C. | [%] | 1.9 | 2.4 | 2.2 |
| | Number of reciprocating abrasions at break at a load of 5 cN/dtex (D) | [times] | 781 | 801 | 812 |
| | Number of reciprocating abrasions at break at a load of 10 cN/dtex | [times] | 42 | 48 | 56 |
| | Difference between (B) and (D) | [times] | 355 | 394 | 373 |

| | | | braid | | |
|---|---|---|---|---|---|
| | | | Comparative Example 2-4 | Comparative Example 2-5 | Comparative Example 2-6 |
| | multifilament used | | Example 1-1 | Comparative Example 1-5 | Comparative Example 1-6 |
| Production method for the braid | Heat treatment temperature | [° C.] | 65 | 139 | 139 |
| | Heat treatment time | [—] | — | 35 min | 35 min |
| | Tension during the heat treatment | [cN/dtex] | — | 0.05 | 0.03 |
| | Draw ratio during heat treatment | [—] | 1.50 | 1.05 | 1.06 |
| Physical properties of the braid | Tensile strength (A) | [cN/dtex] | multifilament was cut in the middle of the drawing | 10 | 11 |
| | Elongation at break | [%] | | 5.8 | 5.7 |
| | Initial modulus | [cN/dtex] | | 302 | 280 |
| | Number of yarn constituting the braid | [number] | | 4 | 4 |
| | Thermal shrinkage at 120° C. | [%] | | 3.5 | 4.2 |
| | Number of reciprocating abrasions at break at a load of 5 cN/dtex (B) | [times] | | 201 | 448 |
| Structure of multifilament in state that braid is unbraided | Maximum value of the peak intensity ratio | [—] | | 0.30 | 0.31 |
| | Minimum value of the peak intensity ratio | [—] | | 0.09 | 0.08 |
| | Difference of the maximum value of the peak intensity ratio and the minimum value of the peak intensity | [—] | | 0.21 | 0.23 |
| | Coefficient of variation of the peak intensity | [%] | | 43 | 51 |
| | Maximum value of the degree of crystal orientation | [—] | | 0.977 | 0.968 |
| | Minimum value of the degree of crystal orientation | [—] | | 0.932 | 0.938 |
| | Difference between the maximum value of the degree of crystal orientation and the minimum value of the degree of crystal orientation | [—] | | 0.045 | 0.030 |
| Physical properties of multifilament in state that braid is unbraided | Titer of monofilament in multifilament | [dtex] | | 1.2 | 4.9 |
| | Tensile strength (C) | [cN/dtex] | | 30 | 21 |
| | Difference between tensile strength (A) and tensile strength (C) | [cN/dtex] | | 20 | 10 |
| | Diameter of monofilament | [μm] | | 10 | 26 |
| | Elongation at break | [%] | | 4.7 | 4.6 |
| | Initial modulus | [cN/dtex] | | 960 | 515 |
| | Thermal stress at 120° C. | [cN/dtex] | | 0.05 | 0.06 |
| | Thermal shrinkage at 70° C. | [%] | | 0.13 | 0.15 |
| | Thermal shrinkage at 120° C. | [%] | | 2.3 | 2.3 |
| | Number of reciprocating abrasions at break at a load of 5 cN/dtex (D) | [times] | | 343 | 819 |
| | Number of reciprocating abrasions at break at a load of 10 cN/dtex | [times] | | 13 | 58 |
| | Difference between (B) and (D) | [times] | | 142 | 371 |

INDUSTRIAL APPLICABILITY

The present invention can provide a multifilament and a braid that are capable of being processed into products in a wide range of temperature and are excellent in dimensional stability and abrasion resistance. The multifilament and the braid according to the present invention can be usable for industrial materials such as cut resistant woven and knitted products for protection, tapes, ropes, nets, fishing lines, protection covers for materials, sheets, strings for kites, archery chords, sail cloths, curtain materials, protection materials, bulletproof materials, medical sutures, artificial tendons, artificial muscles, reinforcing materials for fiber-reinforced resins, cement reinforcing materials, reinforcing materials for fiber-reinforced rubber, machine tool components, battery separators and chemical filters.

The invention claimed is:

1. A multifilament comprising 5 or more monofilaments, wherein
   the multifilament contains polyethylene having an intrinsic viscosity [η] of 5.0 dL/g or more and 40.0 dL/g or less and substantially including ethylene as a repeating unit, and wherein
   a difference between a maximum value and a minimum value in a ratio of a diffraction peak intensity of orthorhombic crystal (200) plane to a diffraction peak intensity of orthorhombic crystal (110) plane in a monofilament cross section is 0.22 or less.

2. The multifilament according to claim 1, wherein a coefficient of variation CV of the peak intensity ratio defined by Equation (1) below is 50% or less:

Coefficient of variation CV (%)=(standard deviation of the peak intensity ratio of the monofilaments)/(average value of the peak intensity of the monofilaments)×100     (1).

3. The multifilament according to claim 1, which has a difference between a maximum value of a degree of crystal orientation and a minimum value of a degree of crystal orientation of 0.010 or less in the mono filament cross section.

4. The multifilament according to claim 1, which shows, in accordance with JIS L 1095, 1000 times or more in number of reciprocating abrasions at break in an abrasion resistance test measured at a load of 5 cN/dtex and 100 times or more in number of reciprocating abrasions at break in an abrasion resistance test measured at a load of 10 cN/dtex.

5. The multifilament according to claim 1, wherein the monofilament has a titer of 3 dtex or more and 40 dtex or less.

6. The multifilament according to claim 1, which has a maximum thermal stress of 0.20 cN/dtex or more.

7. The multifilament according to claim 1, wherein a coefficient of variation CV' of initial modulus defined by Equation (2) below is 30% or less:

Coefficient of variation CV'(%)=(standard deviation of initial modulus of the monofilament)/(average value of initial moduli of the monofilaments)×100     (2)

8. The multifilament according to claim 1, which has a thermal stress of 0.15 cN/dtex or more at 120° C.

9. The multifilament according to claim 1, which has a thermal shrinkage of 0.20% or less at 70° C. and a thermal shrinkage of 3.0% or less at 120° C.

10. The multifilament according to claim 1, which has a tensile strength of 18 cN/dtex or more and an initial modulus of 600 cN/dtex or more.

11. A method for producing the multifilament according to claim 1, the method comprising:
    a dissolution step of dissolving the polyethylene in a solvent to obtain a polyethylene solution;
    a spinning step of discharging the polyethylene solution out of a nozzle at a temperature of melting point of the polyethylene or higher and cooling a discharged yarn thread with a coolant at 10° C. or higher and 60° C. or lower;
    a drawing step of drawing a discharged undrawn yarn while removing the solvent; and
    a winding step of winding a resulting yarn at 50° C. or lower and at a tensile force of 5 cN/dtex or less, wherein
    the drawing step includes 1 or more and 3 or less in number of drawing step, a draw ratio is 7.0 times or more and 60 times or less, and a total drawing time is 0.5 minutes or longer and 20 minutes or shorter.

12. A braid comprising a multifilament comprising 5 or more mono filaments, wherein
    the multifilament contains polyethylene having an intrinsic viscosity [η] of 5.0 dL/g or more and 40.0 dL/g or less and substantially including ethylene as a repeating unit, and wherein
    in the multifilament in a state where the braid is unbraided, a difference between a maximum value and a minimum value in a ratio of a di inaction peak intensity of orthorhombic crystal (200) plane to a diffraction peak intensity of orthorhombic crystal (110) plane in a monofilament cross section is 0.18 or less.

13. The braid according to claim 12, wherein a coefficient of variation CV of the peak intensity ratio defined by Equation (1) below is 40% or less:

Coefficient of variation CV (%)=(standard deviation of the peak intensity ratio of the monofilament)/(average value of the peak intensity of the monofilament)×100     (1)

14. The braid according to claim 12, which has a difference between a maximum value of a degree of crystal orientation and a minimum value of a degree of crystal orientation of 0.012 or less.

15. The braid according to claim 12, which shows 1000 times or more in number of reciprocating abrasions at break in an abrasion resistance test measured at a load of 5 cN/dtex in accordance with JIS L-1095.

16. The braid according to claim 12, wherein in the abrasion resistance test measured at a load of 5 cN/dtex, a difference between a number of reciprocating abrasions of the braid and a number of reciprocating abrasions of the multifilament in a state where the braid is upbraided is 320 times or less.

17. The braid according to claim 12, wherein the multifilament in the state where the braid is unbraided shows 100 times or more in number of reciprocating abrasions at break in an abrasion resistance test measured at a load of 10 cN/dtex in accordance with JIS L-1095.

18. The braid according to claim 12, wherein a difference between a tensile strength of the braid and a tensile strength of the multifilament in the state where the braid is unbraided is 5 cN/dtex or less.

19. The braid according to claim 12, which has a thermal shrinkage of 3.0% or less at 120° C.

20. The braid according to claim 12, which has a tensile strength of 18 cN/dtex or more and an initial modulus of 300 cN/dtex or more.

21. The braid according to claim 12, wherein the monofilament has a titer of 2 dtex or more and 40 dtex or less in the state that the braid is unbraided.

22. The braid according to claim 12, wherein the multifilament in the state that the braid is unbraided has a thermal shrinkage of 0.11% or less at 70° C. and a thermal shrinkage of 2.15% or less at 120° C.

23. The braid according to claim 12, wherein the multifilament in the state that the braid is unbraided has a thermal stress of 0.15 cN/dtex or more at 120° C.

24. A method for producing the braid according to claim 12, the method comprising a step of:
   braiding the multifilament and performing heat treatment, wherein
   the heat treatment is performed at 70° C. or higher; a time of the heat treatment is 0.1 seconds or longer and 30 minutes or shorter; and a tensile force of 0.02 cN/dtex or more and 15 cN/dtex or less is applied to the braid in the heat treatment.

25. The method for producing the braid according to claim 24, wherein a length of the braid after the heat treatment is 1.05 times or more and 15 times or less as long as a length of the braid before the heat treatment by the tensile force.

26. A fishing line obtained from the braid according to claim 12.

27. A net obtained from the braid according to claim 12.

28. A rope obtained from the braid according to claim 12.

* * * * *